United States Patent [19]

Ghuman et al.

[11] Patent Number: 6,081,570
[45] Date of Patent: Jun. 27, 2000

[54] PARALLEL INTEGRATED FRAME SYNCHRONIZER CHIP

[75] Inventors: Parminder Singh Ghuman, Severn, Md.; Jeffrey Michael Solomon, Menlo Park, Calif.; Toby Dennis Bennett, Hyattsville, Md.

[73] Assignee: The United States of America as represented by the Administrator of the National Aeronautics and Space Administration, Washington, D.C.

[21] Appl. No.: 08/921,666

[22] Filed: Sep. 2, 1997

Related U.S. Application Data

[60] Provisional application No. 60/028,733, Oct. 15, 1996.

[51] Int. Cl.[7] .................................................... H04L 7/00
[52] U.S. Cl. .......................................... 375/368; 370/514
[58] Field of Search ................................. 375/368, 370; 370/514, 520; 371/42, 46

[56] References Cited

U.S. PATENT DOCUMENTS

| | | | |
|---|---|---|---|
| 4,168,469 | 9/1979 | Parikh et al. | 375/368 |
| 4,316,285 | 2/1982 | Bobilin et al. | 375/368 |
| 5,646,947 | 7/1997 | Cooper et al. | 370/514 |
| 5,668,840 | 9/1997 | Takano | 375/368 |
| 5,715,278 | 2/1998 | Croft et al. | 375/368 |

OTHER PUBLICATIONS

Third International Symposium On Space Mission Operations and Ground Data Systems—Part 1, *NASA Conference Publication 3281*, Proceedings of a Conference Held at Greenbelt Marriott Hotel, Greenbelt, Maryland USA, Nov. 15–18, 1994.

*Primary Examiner*—Temesghen Ghebretinsae
*Assistant Examiner*—Kevin M Burd

[57] ABSTRACT

A parallel integrated frame synchronizer which implements a sequential pipeline process wherein serial data in the form of telemetry data or weather satellite data enters the synchronizer by means of a front-end subsystem and passes to a parallel correlator subsystem or a weather satellite data processing subsystem. When in a CCSDS mode, data from the parallel correlator subsystem passes through a window subsystem, then to a data alignment subsystem and then to a bit transition density (BTD)/cyclical redundancy check (CRC) decoding subsystem. Data from the BTD/CRC decoding subsystem or data from the weather satellite data processing subsystem is then fed to an output subsystem where it is output from a data output port.

40 Claims, 32 Drawing Sheets

PARALLEL INTEGRATED FRAME SYNCHRONIZER CHIP

CROSS REFERENCE TO RELATED APPLICATION

This application now formalizes and incorporates herein by reference Provisional Application Ser. No. 60/028,733, "Parallel Integrated Frame Synchronizer Chip", Parminder S. Ghuman et al, filed on Oct. 15, 1996, and claims the priority date thereof under 35 U.S.C. §119(e).

ORIGIN OF THE INVENTION

The invention described herein was made by employees of the United States Government and by a contractor employee in the performance of work under a NASA contract and therefore is subject to Public Law 96-517 (35 U.S.C. §200 et. seq.) and may be manufactured and used by or for the Government for governmental purposes without the payment of any royalties thereon or therefor.

BACKGROUND OF THE INVENTION

1. Field of the Invention

This invention relates generally to apparatus for processing digital data and more particularly to a data frame synchronizer for return-link signal processing apparatus receiving a serial data stream from an airborne vehicle such as a spacecraft.

2. Description of Related Art

The rapid growth of chip fabrication densities has resulted in an extremely positive impact of telemetry data systems, particularly those of the National Aeronautics And Space Administration (NASA), the assignee of the present invention.

New data system implementations are currently becoming smaller, cheaper and more powerful due to the availability of higher integration components developed through improved very large scale integrated circuit (VLSI) fabrication processes. For ground telemetry systems, many of these components are the latest standard commercial microprocessors and solid-state memories developed for general purpose computing. Although general purpose components have improved telemetry data system implementations, even greater improvements are being obtained with the addition of components developed specifically for telemetry processing. This effort has led to a series of many different telemetry processing semiconductor components implemented in silicon and gallium arsenide. The high integration levels offered by these components have enabled the development of VLSI based systems that provide an order of magnitude improvement in performance cost and size heretofore unobtainable.

To make full use of today's available VLSI densities, a new series of VLSI application specific integrated circuit (ASIC) components for return link data processing has been developed using the widely adopted packet telemetry protocols recommended, for example, by the Consultive Committee for Space Data Systems (CCSDS).

In the past, telemetry formats tended to be unique for each application or mission. This mission-unique development cycle has led to very high costs for the acquisition and maintenance of data handling systems. To reduce these costs and to promote interoperability between ground processing elements, space data protocol standards outlined by the CCSDS have recently been adopted, and as a result, most future missions, particularly those related to NASA, are being planned so as to use the aforementioned CCSDS protocols.

Systems implementing return link functions are used, for example, in ground stations, control centers, science data processing facilities, space verification equipment, compatibility testing and launch support facilities. Return link processing takes place after the acquisition, demodulation and digitalization of signals transmitted from a spacecraft, e.g. a satellite, as shown in FIG. 1.

Return link processing systems generally extract framed digital data from incoming signal bit streams, correct frame to frame data, validate the protocol structures within the frame, and extract user data. A typical return link processing chain for packetized CCSDS telemetry signals is shown in FIG. 4 and includes apparatus for providing frame synchronization, Reed-Solomon error correction, and service processing.

While the present invention is primarily directed to frame synchronization of telemetry data, it also provides frame synchronization of data from a weather satellite.

Frame synchronization is the process of demarcation of telemetry frame boundaries from an incoming serial bit stream by use of attached sync markers as shown in FIG. 3. Conventional CCSDS telemetry systems, moreover, use a specific digital sync marker pattern (ASM) such as shown in FIG. 3 to delineate data frame boundaries. Because space-to-ground transmission induces numerous types of data disturbances, frame synchronizers employ sophisticated measures in searching for these markers to ensure correct synchronization of data. Thereafter, Reed-Solomon error correction removes errors introduced during the transmission process while CCSDS processing demultiplexes, extracts and validates user data from the composite stream of telemetry frames.

Weather satellites transmit data in a pseudo noise (PN) pulse stream. Nevertheless, frame synchronization of such data is still required before any kind of data processing can be done.

SUMMARY

Accordingly, it is an object of the present invention to provide an improvement in apparatus which receives a digital data stream from airborne vehicles, such as satellites.

It is a another object of the invention to provide an improvement in the return link signal processing of a serial data stream from satellites.

It is a further object of the invention to provide an improvement in apparatus for implementing data frame synchronization of the serial data stream input to return link signal processing apparatus.

The foregoing and other objects of the invention are achieved by the architecture of a parallel integrated frame synchronizer (PIFS) and its method of performing telemetry frame synchronization and its implementation on a semiconductor chip. It is controlled by a set of internal registers that are configured through a standard microprocessor interface prior to operation so as to meet the needs of a plurality of operational modes. The PIFS in accordance with this invention implements a sequential pipeline process wherein data enters the synchronizer by means of a front-end subsystem and passes to a parallel correlator subsystem or a weather satellite data processing subsystem. When in a CCSDS mode, data from the parallel correlator subsystem passes through a window subsystem, then to a data alignment subsystem and then to a bit transition density (BTD)/cyclical redundancy check (CRC) decoding subsystem. Data from the BTD/CRC decoding subsystem or data from the weather satellite data processing subsystem enters an output subsystem where it is fed to a data output port.

Further scope of applicability of the present invention will become apparent from the description provided hereinafter. It should be understood, however, that the detailed description and specific example set forth therein, while disclosing a preferred embodiment of the invention, is provided by way of illustration only, since various changes and modifications coming within the spirit and scope of the invention will become apparent to those skilled in the art with this detailed description.

BRIEF DESCRIPTION OF THE DRAWINGS

The present invention will become more readily understood from the detailed description provided hereinafter and the accompanying drawings which are provided by way of illustration only, and thus are not meant to be limitative of the invention, and wherein.

DETAILED DESCRIPTION OF THE INVENTION

Figure 1:
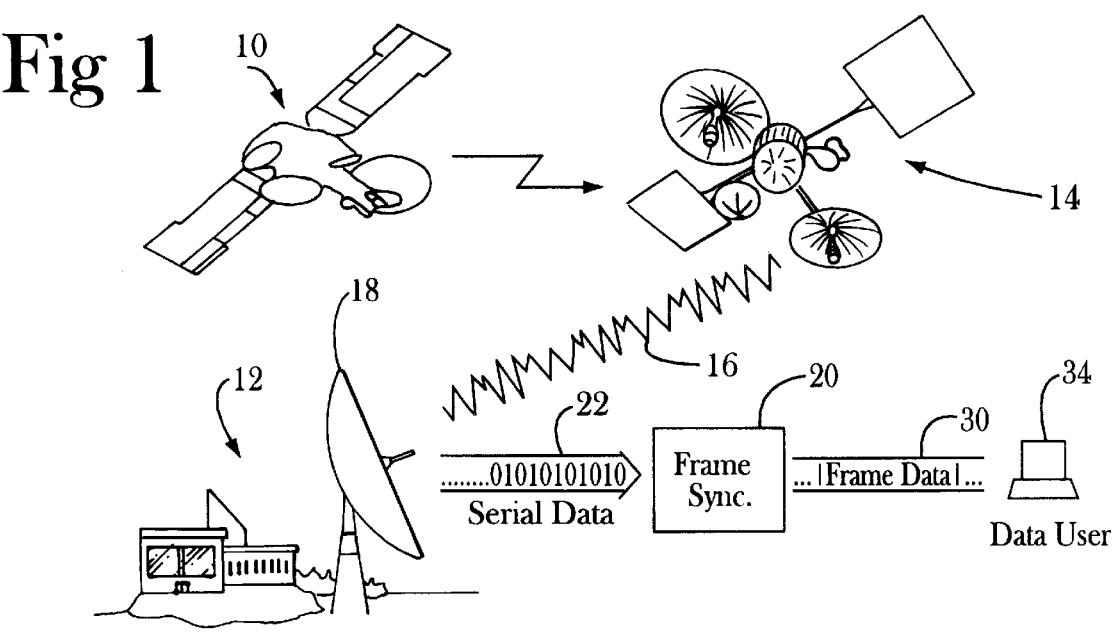
FIG. 1 is a diagram illustrative of a typical down link telemetry system.

Referring now to the drawings and more particularly to FIG. 1, shown thereat is an illustration of a typical telemetry system wherein telemetry data is transmitted from a spacecraft 10 to a ground telemetry processing facility 12 via a telemetry data relay spacecraft system (TDRSS) 14 in a modulated form as shown by reference numeral 16 where it is received by a parabolic dish antenna 18. The processing facility 12 demodulates the data and sends it to a frame synchronizer 20, which comprises the subject matter of this invention. The synchronizer 20 is required because space to ground communication induces errors in the down-link data stream 16.

Figure 2:
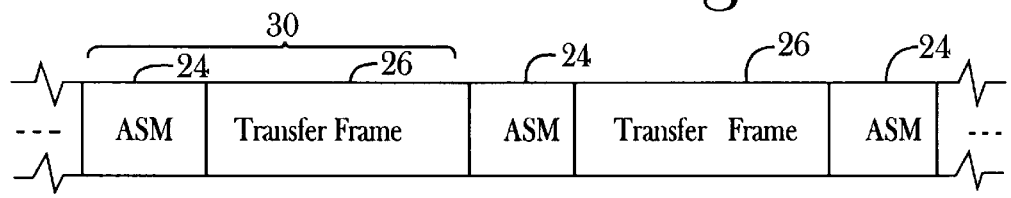
FIG. 2 is a diagram illustrative of the telemetry data consisting of a stream of fixed length transfer frames of data with attached sync markers (ASM) located therebetween.

Synchronization is achieved by locating valid sync marker patterns (ASM) 24 between fixed length data frames 26 in a serial data stream 22 so as to provide a composite frame of data 30 as shown in FIG. 2. The synchronizer 20 recognizes and corrects an ASM 24 (FIG. 2) in the demodulated data stream 22 that is used to delineate the beginning of each frame 26 of telemetry data with an ASM internally generated in the synchronizer 20 and allows error tolerance in the bit pattern of the incoming data stream 22. The ASM 24 for one transfer frame 26, immediately follows the end of the preceding transfer frame 26. There is no intervening bits between the ASM 24 and the transfer frame 26.

Figure 3:
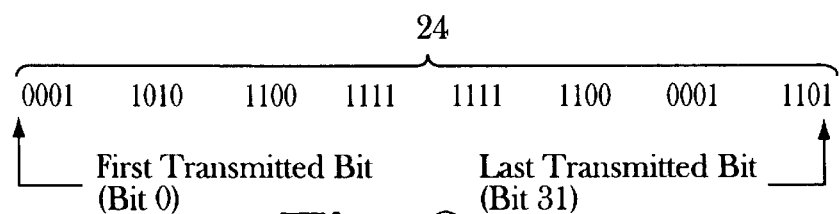
FIG. 3 is a digital pattern illustrative of a typical 32-bit ASM.
Figure 4:
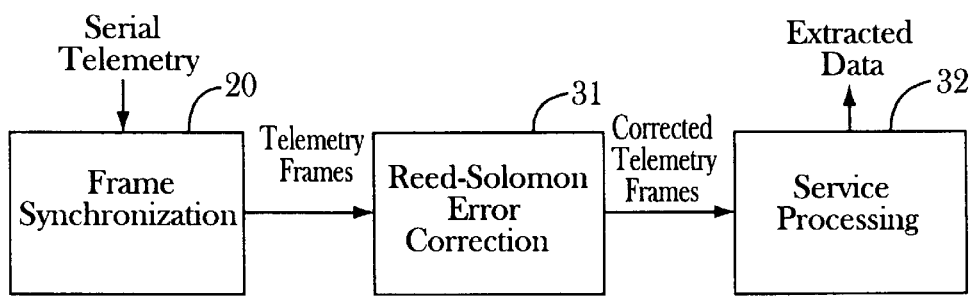
FIG. 4 is a diagram illustrative of a typical return link processing chain for telemetry signals in accordance with the subject invention.

While not being limited thereto, the Consultive Committee for Space Data Systems (CCSDS) protocol, for example, typically calls for a 32-bit ASM having a pattern as shown in FIG. 3. The digital bit pattern shown in FIG. 3 can be represented in hexadecimal notation as 1ACFFC1d. However, a sync marker pattern up to 64 bits can be utilized when desired. The output of the frame synchronizer 20, as shown in FIG. 2, thereafter typically undergoes a well known Reed-Solomon error correction shown by reference numeral 31, and service processing as shown by reference numeral 32 before being sent to a data user 34 as shown in FIG. 4. The parallel integrated frame synchronizer (PIFS) 20 in accordance with the subject invention is implemented on a semiconductor chip mounted on a printed circuit board 36 as shown in FIG. 5.

Figure 5:
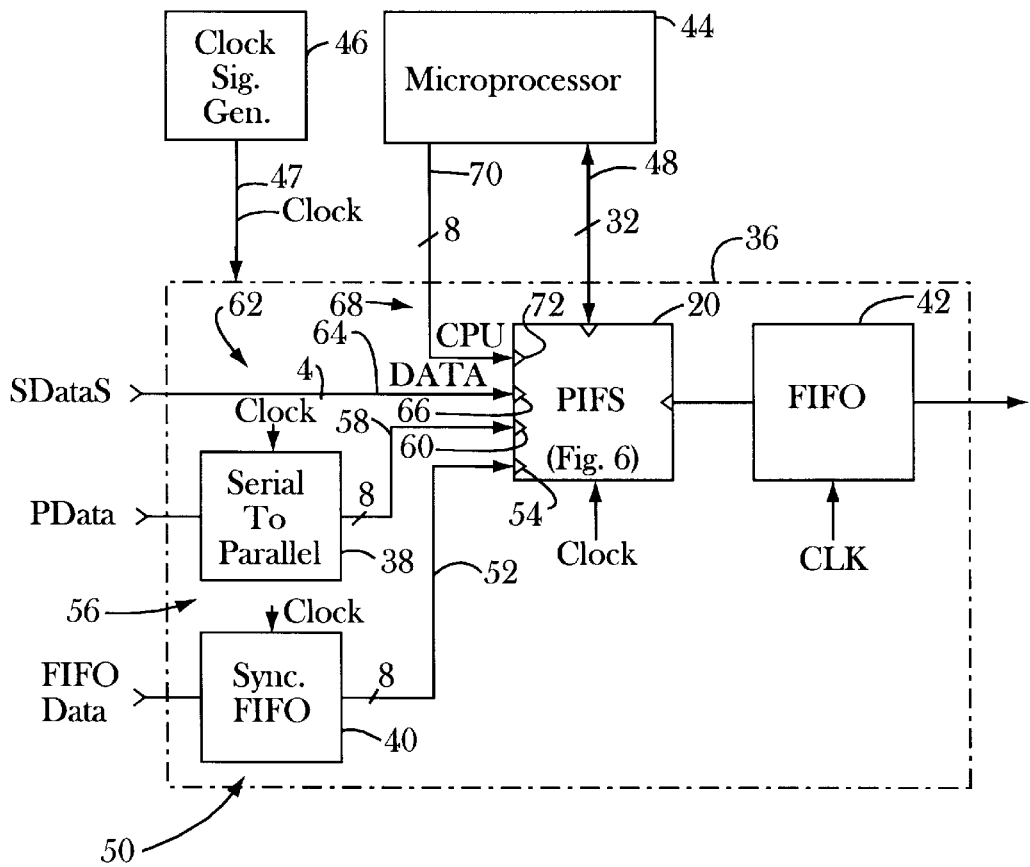
FIG. 5 is an electrical block diagram illustrative of apparatus for performing parallel integrated frame synchronization (PIFS) in accordance with the subject invention.

Referring now to FIG. 5, associated with the PIFS chip 20 is a serial to parallel data converter 38, a synchronous first-in, first-out input (FIFO) memory 40 and a FIFO output memory 42. Operation of the PIFS 20 is controlled by an external microprocessor 44 and an external clock (CLOCK) signal from a system clock signal generator 46. The CLOCK signal is applied to the synchronizer 20 on signal line 47.

To input data into the PIFS 20, a user may select one of four different interfaces via a 32-bit bidirectional control bus 48 coupled to the microprocessor 44. The first interface comprises a FIFO interface 50 which permits the user to input data (FIFO DATA) into the synchronizer 20 from the synchronous FIFO memory 40 via an 8-bit data bus 52 connected to an input port 54. The second interface comprises an asynchronous parallel data interface 56 which permits asynchronous high speed data (PDATA) to be coupled from an external asynchronous device, not shown, via the serial to parallel converter 38, and an 8-bit data bus 58 connected to an input port 60. The third interface comprises a serial data interface 62 which permits the user to input serial data (SDATA) into the PIFS 34 and comprises a 4-bit data bus 64 which connect to four corresponding serial data input ports shown by reference number 66 in FIG. 5. The fourth interface comprises a test interface 68 and which comprises an 8-bit data bus 70 from the microprocessor 44 to an input port 72 for inputting test data (CPU DATA) from a CPU, not shown, in the microprocessor 44 for "debugging" the PIFS chip 20.

Figure 6:
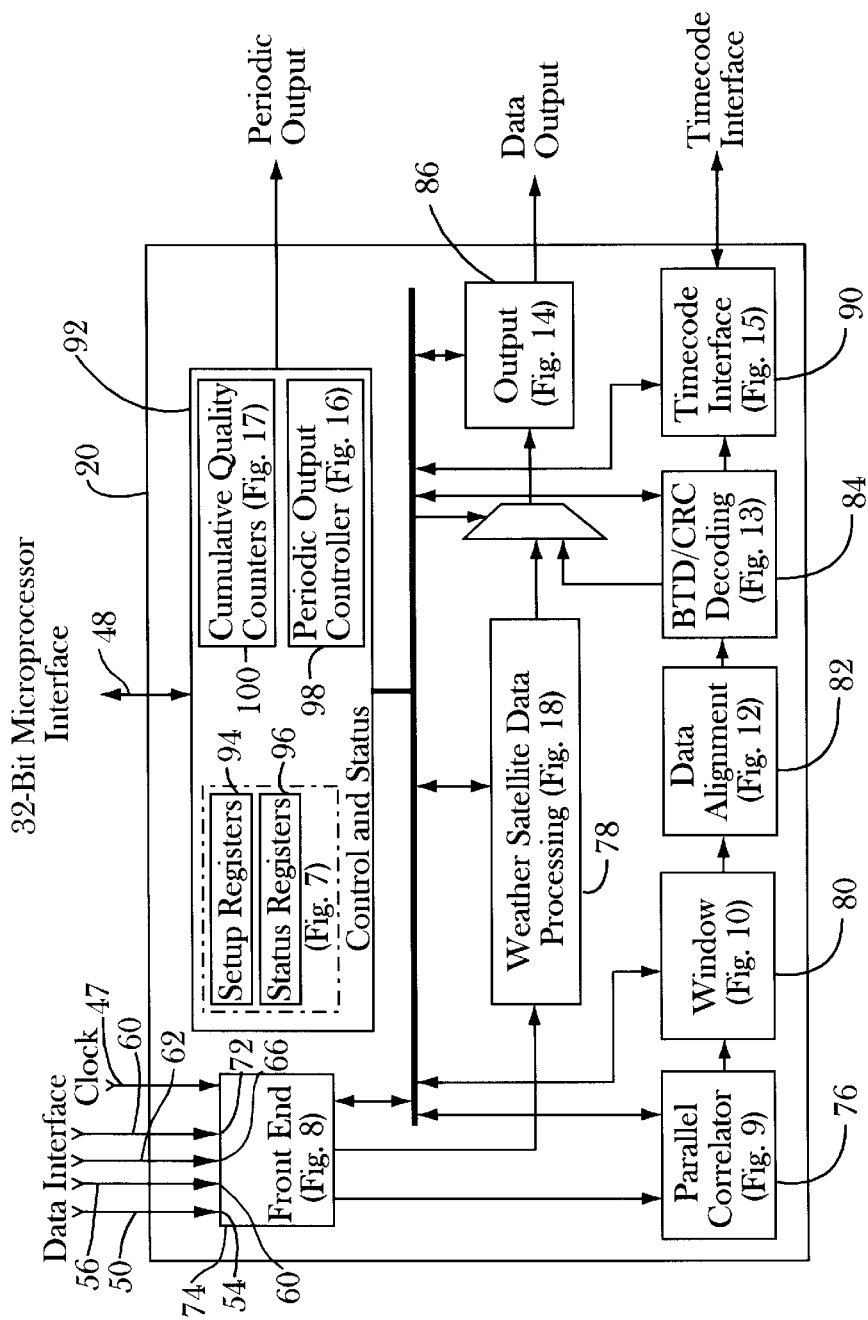
FIG. 6 is an electrical block diagram of a preferred embodiment of the parallel integrated frame synchronizer (PIFS) shown in FIG. 5.

A block diagram of the PIFS 20 is shown in FIG. 6. Referring now to FIG. 6, data passes through the PIFS 20 in a sequential pipeline process. Digital data including FIFODATA, PDATA, SDATA and CPU DATA enters the chip via a front end subsystem 74 coupled to the four interfaces 50, 56, 62 and 68 shown in FIG. 5. The data out of the front end subsystem 74 passes either to a parallel correlator subsystem 76 or a weather satellite data processing subsystem 78.

If the PIFS 20 is in the CCSDS down link mode wherein telemetry data other than weather data is received, data from the parallel correlator subsystem 76 passes to a window subsystem 80, then to a data alignment subsystem 82, and then to a bit transition density (BTD)/cyclical redundancy check (CRC) decoding subsystem 84. Data from the BTD/CRC decoding subsystem 84 or data from the weather satellite data processing subsystem 78 is then fed to an output subsystem 86.

The PIFS 20 also includes a timecode interface 90 which will be described subsequently. A control and status section 92 which is comprised of a plurality of setup registers 94, and a plurality of status registers 96 shown in the diagram of FIG. 7, a periodic output controller 98 and a plurality of cumulative quality counters 100 for providing housekeeping and data flow control.

Figure 8:
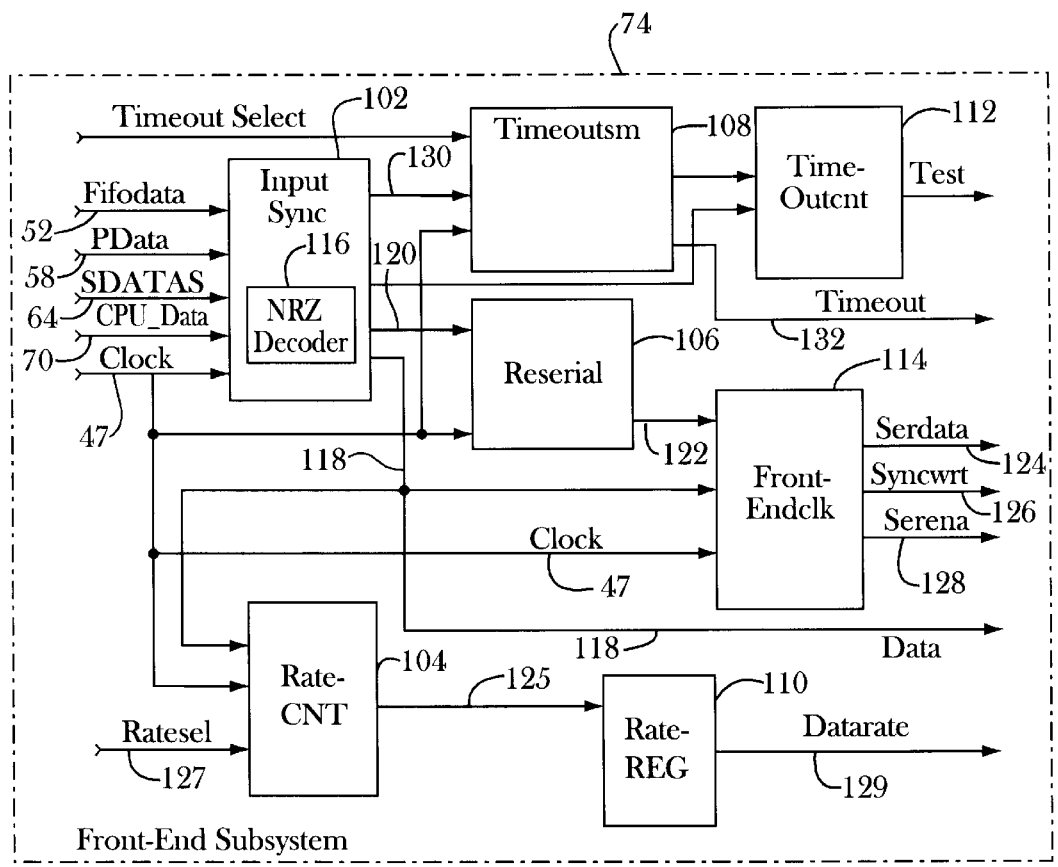
FIG. 8 is a block diagram illustrative of the front-end subsystem shown in FIG. 6.

Considering now each of the various subsystems shown in FIG. 6, the front end subsystem 74 is shown in greater detail in FIG. 8 and includes an internal input synchronizer 102, a rate counter 104, a reserializer 106, a timeout mechanism 108, a rate regulator 110, a timeout counter 112, and a front end clock 114. The internal input synchronizer 102 also includes a NRZ decoder 116 which is used to convert, if need be, input data into an NRZ-L format if the inputted data is coded in an NRZ-M or an NRZ-S format. The purpose of the front-end subsystem is primarily to synchronize the input data to a system clock i.e. the clock signal generator 46 (FIG. 1) and, where necessary, convert serial data into parallel data.

As shown in FIG. 8, the input synchronizer (INPUT SYNC) 102 receives as inputs four data signals and a clock signal and shown as: FIFO DATA on input data bus 52, PDATA on input data bus 58, SDATAS on input data bus 64, CPU DATA on input data bus 70, and a CLOCK signal on signal line 47. The INPUT SYNC 102 operates to synchronize the inputted data to the CLOCK signal on line 47 and convert serial data SDATA input on bus 64 to parallel data. If the inputted data needs decoding, it is applied to the NRZ decoder 116. If no decoding is necessary, the synchronized data is fed to a parallel data output bus 118. It is also fed to a rate counter (RATE-CNT) 104 or an output unit termed the front-end clock (FRONT-ENDCLK) 114. If decoding is necessary, the synchronized data is first fed out of the input synchronizer 102 on bus 120 where it is reserialized in the unit 106 before being fed to data bus 122 to the front-end clock (FRONT-ENDCLK) unit 114. The FRONT-ENDCLK 114 operates to output serial data (SERDATA) on the data bus 124 which is synchronized to the system CLOCK signal on signal lead 47, generates a sync write (SYNCWRT) signal on line 126, and a serial enable signal (SERENA) on signal line 128.

The rate counter (RATE-CNT) 104 in the front end subsystem 74 is responsive to the CLOCK signal on line 47 and the parallel data on bus 118 to determine the number of input data bytes received during a selectable number of system clock cycles and allows the user to monitor the data rate of the incoming data. The rate counter 104 outputs the data rate (DATARATE) fed to the rate register (RATE-REG) 110 via signal line 125 in response to a rate select (RATESEL) input control signal on line 127. The DATARATE output signal appears on signal line 129.

The front-end subsystem 74 also includes a user programmable timeout feature which operates to flush, i.e. feed forward data presently in the pipeline out to the next subsystem, i.e. the parallel correlator 76 (FIG. 9), if data is not being input for a predetermined number of system clock cycles. This is provided by a mechanism 108 termed TIMEOUTSM and is responsive to data to be outputted from the INPUT SYNC 102 which appears on bus 130 and the CLOCK signal on line 47. The data in the pipeline to be flushed is ordered in response to a TIMEOUT control signal which is generated in the TIMEOUTSM 108 and which appears on signal line 132. The TIME-OUTCNT unit 112 comprises a counter which merely keeps track of how many bytes of data which can remain without a timeout signal being generated.

Figure 9:
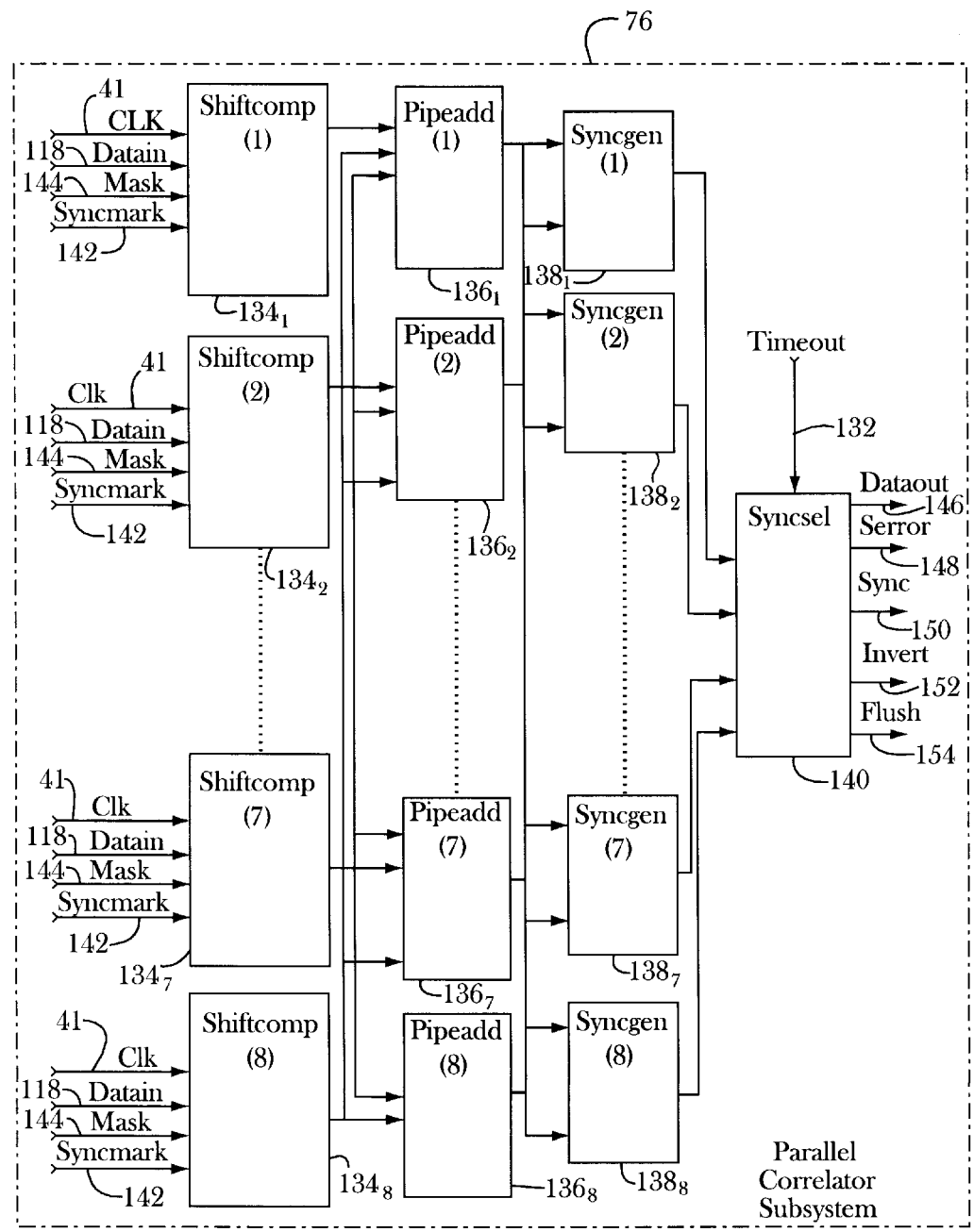
FIG. 9 is an electrical block diagram illustrative of the parallel correlator subsystem shown in FIG. 6.

Referring now to FIG. 9, shown thereat is a block diagram of the parallel correlation subsystem 76. It is comprised of eight identical data bit comparators $134_1$, $134_2$ ... $134_8$ termed a shift comparator (SHIFTCOMP), eight digital adders $136_1$, $136_2$ ... $136_8$ termed pipe-adders (PIPEADD), eight digital signal generators $138_1$, $138_2$ ... $138_8$, termed sync marker generators (SYNCGEN) and a sync marker output selector (SYNCSEL) 140.

Figure 7:
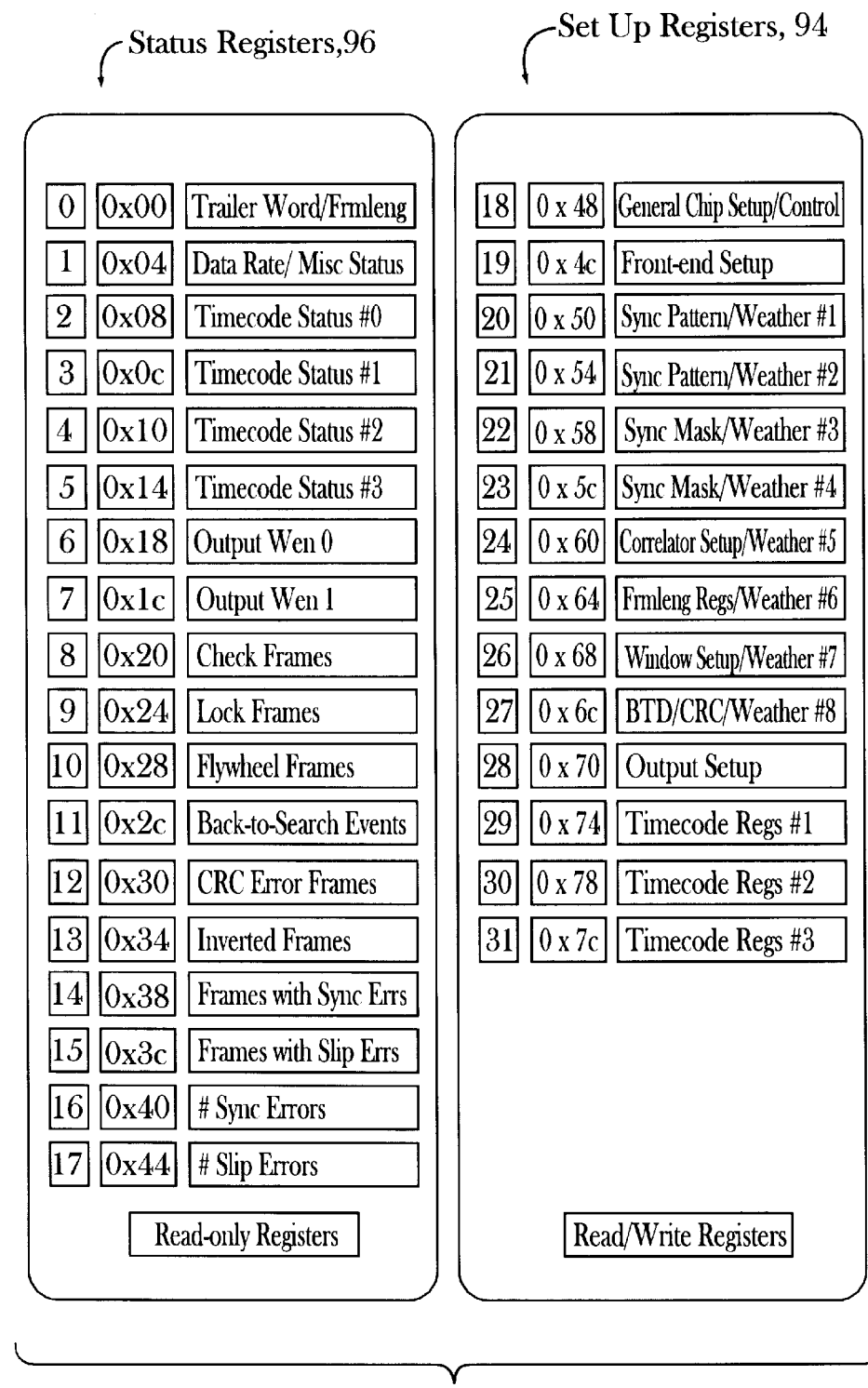
FIG. 7 is a diagram identifying the set up registers and status registers shown in FIG. 6.

The parallel correlator subsystem 76 compares the parallel data stream outputted from the front end system 74 via data bus 118 on a bit-by-bit basis to a stored sync marker pattern (SYNCMARK) applied via bus 142 and which has initially been set up in the setup registers #20 or #21, shown in FIG. 7, under the control of the microprocessor 44, the purpose being to detect the presence of a valid sync marker or ASM 24 (FIG. 3) in the data stream.

The SHIFTCOMP comparators $134_1$ ... $134_8$ respectively receive successive single bits of an 8-bit data byte of the data stream DATAIN on bus 118 and correlates a sync marker pattern (ASM) of up to 64 bits in parallel fashion. Accordingly, the first SHIFTCOMP $134_1$ accepts the first bit appearing on data bus 118, the second SHIFTCOMP $134_2$ receives the next or second bit of the same data byte, and so on, with the eighth bit of the 8-bit data byte being fed to SHIFTCOMP $134_8$.

Each respective bit is compared against a corresponding bit of an expected sync marker data byte which has been fed to a respective SHIFTCOMP $134_1$ ... $134_8$ and any error determined thereby is fed to a respective pipeline adder PIPEADD. The PIPEADDs $136_1 \ldots 136_8$, calculate the total number of correlation bit errors detected. If the sync marker pattern (ASM) sought is comprised of 32 bits, 4 consecutive 8-bit data bytes are sequentially correlated in a single correlation cycle.

When desirable, some of the bits can be masked. This is accomplished by data bit (MASK) inputs being fed from the setup registers 94 (FIG. 7) via data bus 144. Once 4 bytes making up the 32 bit sync marker pattern are processed, the adders $136_1 \ldots 136_8$ add up all of the bit mismatches. This number is then fed to the set of sync marker generators (SYNGEN) $138_1 \ldots 138_8$ which determine whether a valid sync marker (ASM) is present based upon the total errors generated by the PIPEADD adders $136_1 \ldots 136_8$. This is achieved by comparing the total errors counted against an error tolerance set by the user in the set up register 24 (FIG. 7). If the total number of errors in the four bytes of data are less than the designated error tolerance, a valid sync marker is generated by each of the sync generators (SYNGEN) $138_1 \ldots 138_8$. The sync marker selector (SYNSEL) 140 accepts all of the sync markers generated by the SYNGENs and selects one of the sync markers which has at a bit position which coincides with the bit where the data started.

Figure 10:
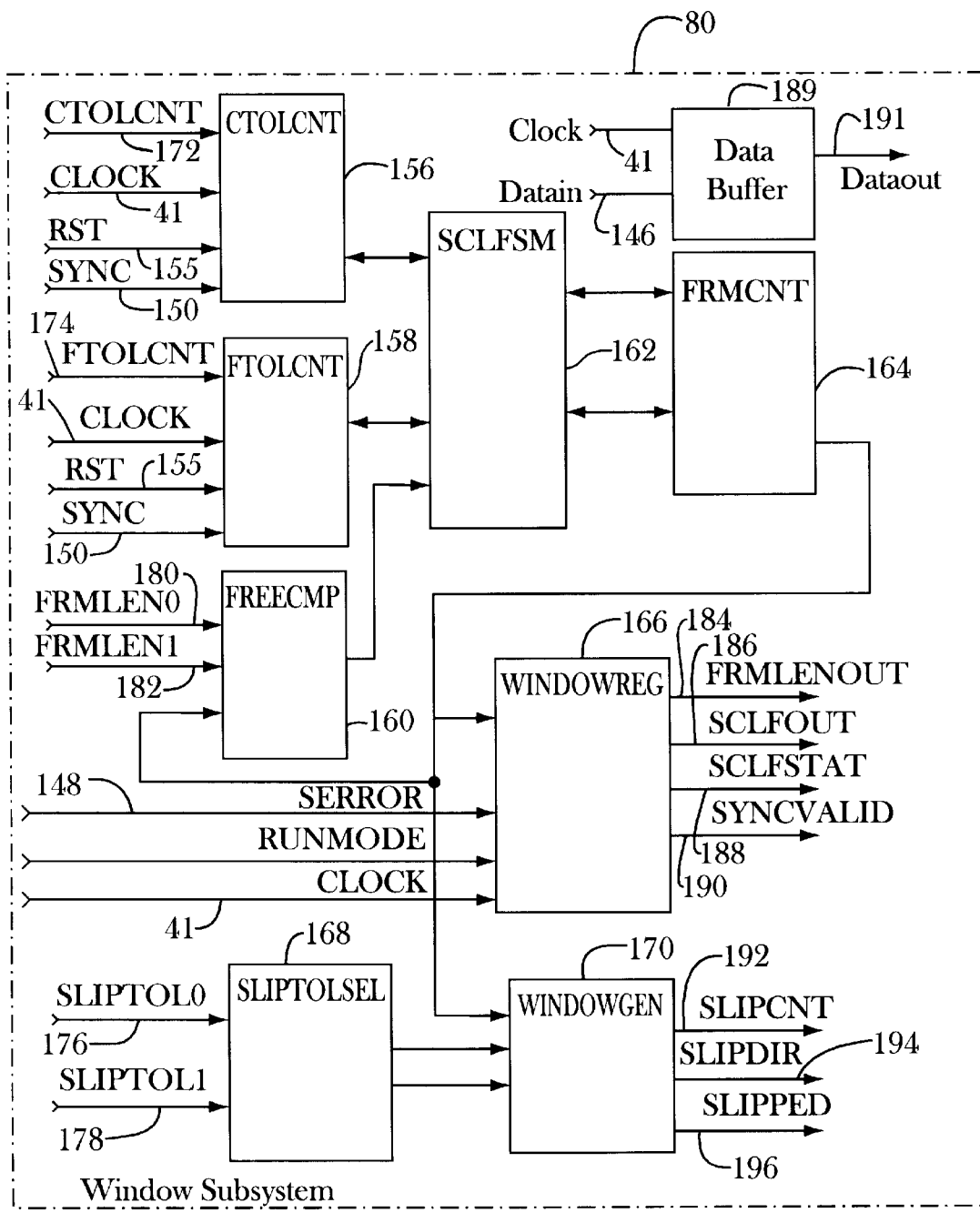
FIG. 10 is an electrical block diagram illustrative of the window subsystem shown in FIG. 6.

The eight sync generators (SYNGEN) $138_1 \ldots 138_8$ in addition to calculating a valid sync marker based upon the total errors generated by the adders $136_1 \ldots 136_8$ also determine whether the incoming data (DATAIN) is true or inverted data. The sync selector 140 then outputs the data on bus 146, outputs an error signal flag (SERROR) on line 148 if the DATOUT on bus 146 comprises bad data, the generated sync marker (SYNC) on bus 150 and inverted data on bus 152 if the data is inverted. A flush (FLUSH) signal flag is generated on line 151 if the time out mechanism 108 in FIG. 8 generates a TIMEOUT signal on line 132, indicating the data presently in the pipeline is to be flushed out. After the parallel correlator subsystem 76 correlates the data and detects what appears to be a valid sync pattern (ASM) in the data stream, it passes the data (DATAOUT) to the window subsystem 80 shown in FIG. 10 for further validation. The purpose of the window subsystem 80 is to lock onto a valid sync marker when detected. Referring now to FIG. 10, the window subsystem 80 includes a check mode tolerance counter (CTOLCNT) 156 a flywheel mode tolerance counter (FTOLCNT) 158, a free frame comparator (FREECMP) 160, a search/check/lock/ flywheel state machine (SCLFSM) 162, a frame counter (FRMCNT) 164, a window register (WINDOWREG) 166, a slip tolerance selector (SLIPTOLSEL) 168, and a window generator (WINDOWGEN) 170. The window subsystem 80 determines whether or not a valid sync marker is being received under a predetermined set of error tolerances initially established by the set up registers #26, (FIG. 7), in accordance with an algorithm shown by the SCLF state diagram of FIG. 11 and which is implemented by the SCLFSM 162.

Initially a check tolerance count (CTOLCNT) signal is fed to the CTOLCNT counter 156 from the set-up registers #26 on lead 172. In a like manner, a flywheel tolerance count signal (FTOLCNT) is sent to the FTOLCNT counter 158 via the signal lead 174, along with two bit slip tolerance signals SLIPTOL0 and SLIPTOL1 which are fed to the slip tolerance select (SLIPTOLSEL) register 168 on circuit leads 176 and 178.

The window subsystem 80 operates in four different modes to lock on to a valid sync marker; a regular mode, a variable frame length mode, a free-range mode and a asynchronous block mode.

In the regular mode, the window subsystem 80 locks to sync markers separated by predetermined frame length bytes programmed from register #25.

In the variable frame length mode, the window subsystem 80 locks the sync marker to any frame length that is inclusively in between the two frame lengths FRMLEN0 and FRMLEN1 programmed into the free comparator 160 from set up register #25 (FIG. 7). The window subsystem will start out in "search" as shown in FIG. 11, and will go to "lock" as long as the sync marker keeps coming in at a distance in between the two frame lengths FRMLEN0 and FRMLEN1.

Figure 11:
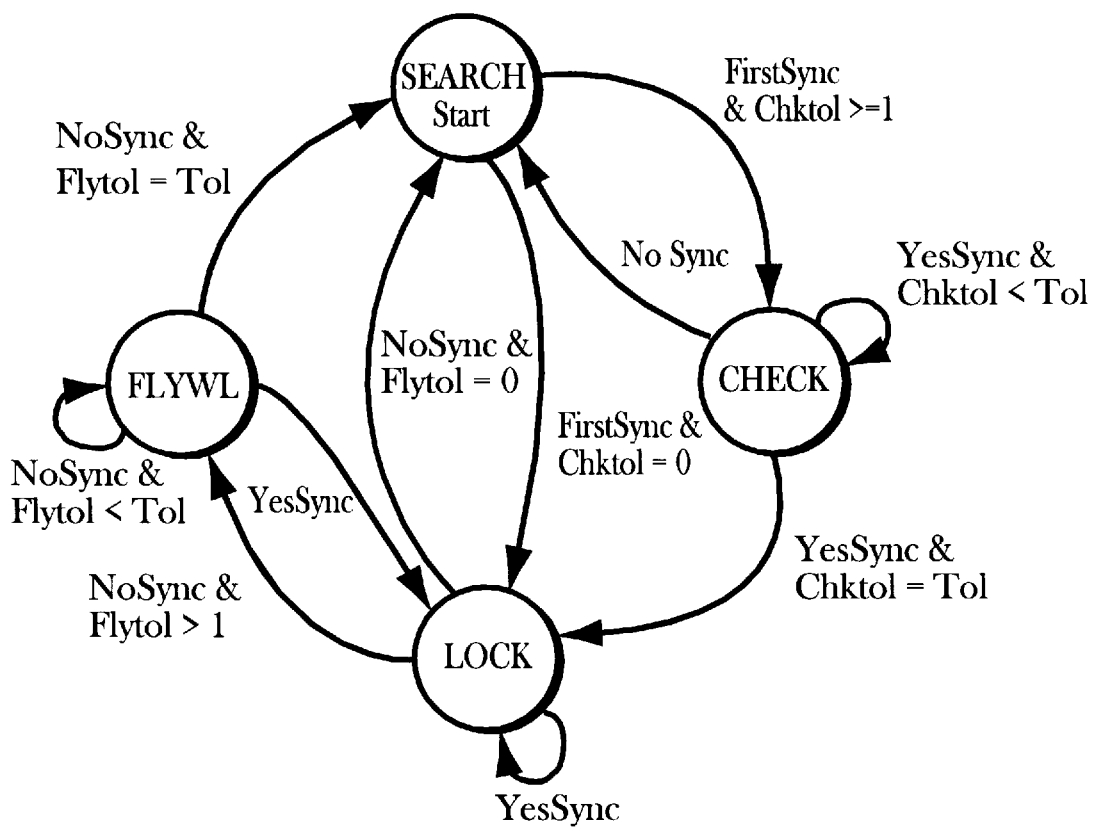
FIG. 11 is a search check lock flywheel (SCLF) state diagram illustrative of the algorithm implemented by the window subsystem shown in FIG. 10.

The free-range mode is similar to the variable frame length mode except that after the first two sync markers have been seen, the window subsystem tries to lock the sync marker to that frame length, using the SCLF algorithm as shown in FIG. 11. This mode is particularly useful when data frame length is unknown. When the first sync marker is received by the SCLFSM machine 162, it looks for a second sync mark within the range specified by the two frame lengths FRMLEN0 and FRMLEN1. If a sync mark appears in that range, the window subsystem uses the distance between the first and second sync marks as the input frame length and continues processing the algorithm shown in FIG. 11.

The algorithm calls for recycling in a "check" or "flywheel" mode, depending upon the check and flywheel tolerances CTOLCMT and FTOLCMT set into the counters 156 and 158, respectively. The counters 156 and 158 control the number of frames that are to be processed before going into a lock mode, and thus the window subsystem will stay in the "check" mode or the "flywheel" mode until the check tolerance count is less than the tolerance initially programmed.

Once a first sync marker is received but another sync marker does not follow, a default is made back to the "search" mode and the program will again continue to loop until a valid sync marker is found to be present and the check tolerance count is equal to the tolerance programmed, at which time it goes into a lock mode. A lock indicates that valid frame data is present.

With respect to the asynchronous block mode, the PIFS tags the first byte of data as the start of the first data frame and thereafter use a programmed predetermined frame length. Data is simply blocked up into frame-length chunks.

The frame counter (FRMCNT) 164 counts the number of "lock" frames. The free comparator (FREECMP) 160 is used to outline the frame boundaries in accordance with the two frame lengths FRMLEN0 and FRMLEN1 initially fed thereto on lines 180 and 182. This allows frames to be processed which are not equal in length and is particularly used in the variable frame length mode and basically tells the SCLFSM machine 162 what type of frame to process, whether it is a variable length frame or a fixed length frame, or whether it wants to run in the free range mode. Accordingly, the window register (WINDOWREG) 166 is adapted to output frame length on line 184, data processed by SCLFSM 162 on bus 186, SCLF status on line 188 and an indication on line 190 that valid sync mark (SYNCVALID) data is present. The data output from the parallel correlator subsystem 76 (FIG. 9) on bus 146 is buffered in pipeline data buffer 189 until a SYNCVALID signal is generated and output from the window register 166 at which time it is fed to the data alignment subsystem 82 shown in FIG. 12.

With respect to the slip tolerance selector (SLIPTOLSEL) 168 and the window generator (WINDOWGEN) 170, they permit the window subsystem 80 to accept a sync marker that has slipped one or more bits or gained one or more bits within the programmed sync marker boundaries, indicating that the system should nevertheless accept this data. If slip tolerances SLIPTOL0 and SLIPTOL1 have been entered into SLIPTOLSEL 168, the WINDOWGEN 170 will generate a window of tolerance around an acceptable sync marker. Accordingly, the window generator 170 outputs an indication of the slip count (SLIPCNT) on signal line 192, the slip direction (SLIPDIR) on line 194, and whether or not the slip (SLIPPED) is in the sync marker window on line 196.

Two different slip and error tolerances can be set. Accordingly, the valid values for slip tolerance are 0 to 4 bits. Slip tolerance allows the window subsystem 80 to recognize a valid sync marker by widening the window by the slip bits set in the set-up register 94 (FIG. 7). The error tolerance is set by the set-up registers 94 to tell the window subsystem how many bit errors should be allowed in an incoming sync marker to still be recognized as a valid sync marker. The range of error values permitted is from 0 to 31. Setting the error tolerance too "wide" will cause the window subsystem 62 to false lock randomly. Also, the check tolerance count (CTOLCNT) and the flywheel tolerance count (FTOLCNT) can be set from 0 to 15 frames. The check tolerance count tells the SCLFSM 162 how many frames to process in the "check" mode before proceeding to "lock" (FIG. 11). The flywheel tolerance count tells the window subsystem how many frames to process after it has fallen out of "lock" before it goes back into the "search" mode.

The scheme shown in FIG. 11 offers an optional "best match" strategy in the "check" or "lock" modes depending upon the check tolerance (CHKTOL) value. Best match strategy is implemented between the time the first sync marker is found and the subsequent sync marker is searched for within the designated frame length. After accepting the first sync marker, if there is another sync marker with fewer errors than the first sync marker, the subsequent sync marker is accepted and in such instance, the current frame is output as a short frame.

Turning attention now to the data alignment subsystem 82, reference will now be made to FIG. 12 which depicts the data alignment system 82 being comprised of a synchronous first-in, first-out alignment (SYNCFIFO ALIGN) memory 198, first and second boundary registers (BOUNDARY REGISTER) 200 and 202, an alignment finite state machine (ALIGNFSM) 204, an 8-bit byte regenerator (REGEN8) 206, an alignment register (ALIGNREG) 208, a multiplexer (MUX) 210, a data inverter (INVERT) 212, an alignment control signal generator designated (ALIGNP) 214, and a 16-bit down counter (DCNT 16) 216.

The data alignment subsystem 82 takes DATA from the window subsystem 80 on bus 191 and aligns frame data 30 (sync marker ASM data 24 and transfer frame data 26) to specified byte boundaries. When slips occur which can add or subtract bits from the frame data 30, the last byte is filled with 1's and 0's. When a data flush occurs, the data frame is padded to frame length bytes and the boundary between two consecutive frames is saved as status that can be optionally appended.

Figure 12:
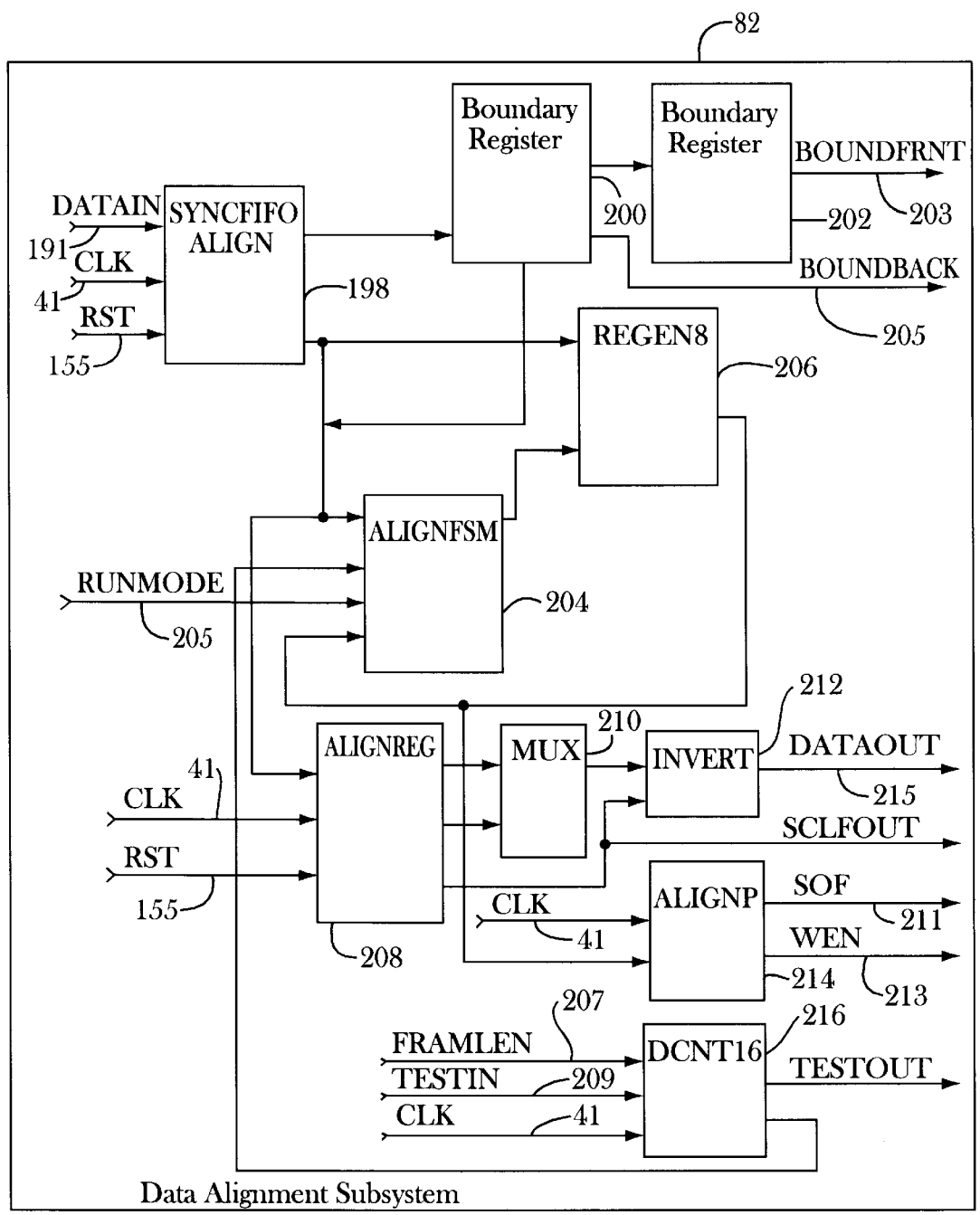
FIG. 12 is an electrical block diagram illustrative of the data alignment subsystem shown in FIG. 6.

As shown in FIG. 12, DATA, CLOCK and reset (RST) signals on bus 190 and signal lines 41 and 155 are fed into SYNCFIFO ALIGN 198. The type of operating mode (RUNMODE) in which the window subsystem 80 is operating is fed as a control signal to the alignment finite state machine (ALIGNFSM) 204 on signal line 205. The clock (CLK) and reset (RST) signals are also fed to the alignment register (ALIGNREG) 208. The clock (CLK) signal is also fed into the 16 bit down-counter (DCNT16) 216 along with a frame length (FRAMLEN) signal and, when required, an input test (TESTIN) signal on leads 207 and 209.

The frame data 30 (FIG. 2) which is stored in the SYNCFIFO ALIGN memory 198 is fed to the boundary registers 200 and 202 as well as the regenerator (REGEN8) 206. The boundary registers 200 and 202 generate a pair of outputs identified as boundary front (BOUNDFRNT) and boundary back (BOUNDBACK) which are fed to the following subsystem, i.e. the BTD/CRC decoding subsystem 84 shown in FIG. 13 on buses 203 and 205, telling it where data alignment of the frame data began and ended. The ALIGNFSM 204 takes the data frame input from memory 198 and aligns the data based upon the mode being run by the window subsystem 80.

The data in the first boundary register 200 is also fed therefrom to the alignment register (ALIGNREG) 208 along with data from REGEN8 206. ALIGNP 214 also gets the output from the REGEN8 206 and operates to generate a start of frame (SOF) signal on line 211 and a write enable (WEN) output signal on line 213, indicating that the DATAOUT from the inverter 212 on bus 215 is properly aligned and it comprises a valid block of frame data 30. The down counter (DCNT16) 216 merely counts frame lengths and keeps track of the frame as it is being processed by the ALIGNFSM 204.

Figure 13:
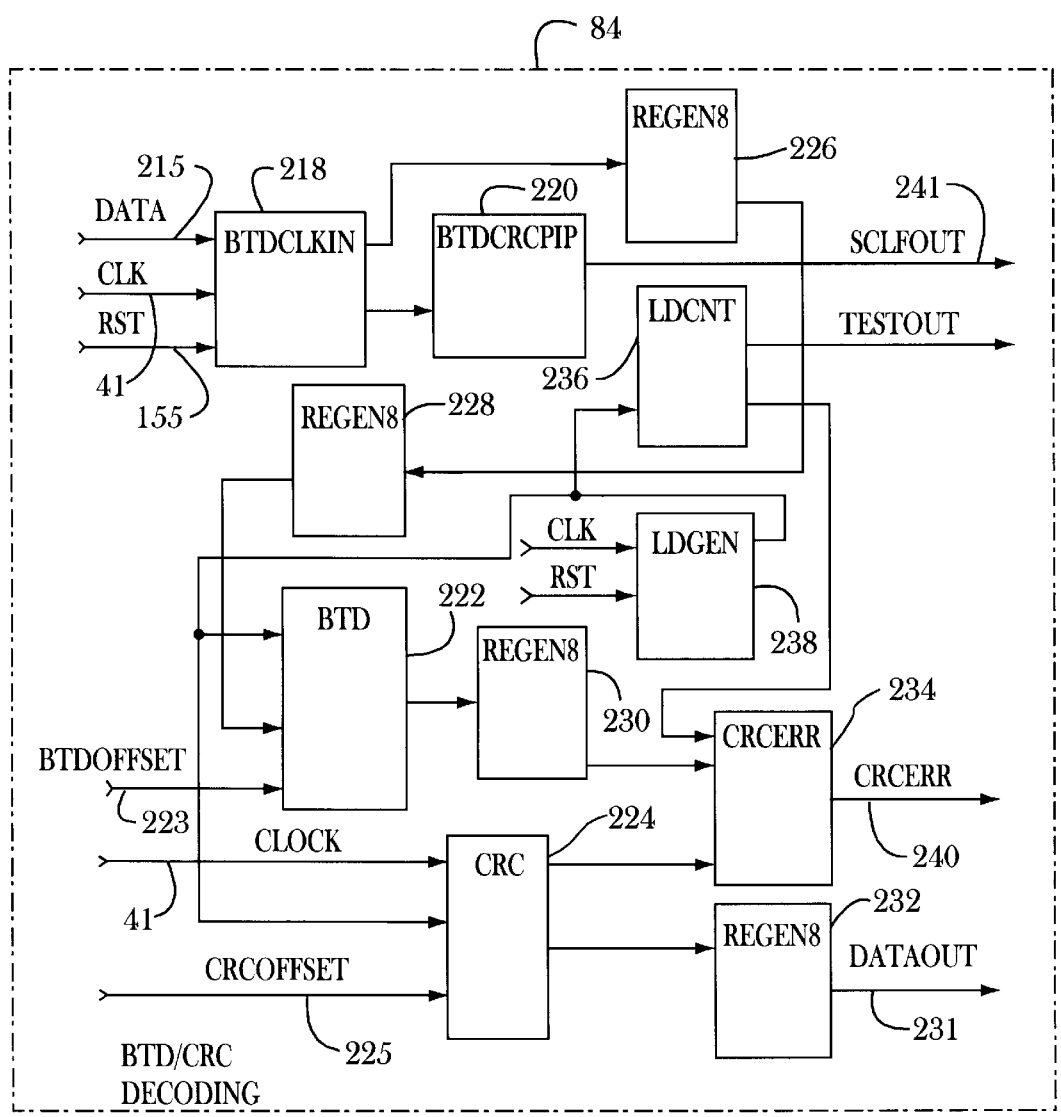
FIG. 13 is an electrical block diagram illustrative of the BTC/CRC decoding subsystem shown in FIG. 6.

Considering now the BTD/CRC decoding subsystem 84 (FIG. 6), the apparatus shown in FIG. 13 implements both optional bit density decoding (BTD), and cyclic redundancy check (CRC) error detection of the data stream outputted from the alignment subsystem 82 on bus 215.

The BTD/CRC decoding subsystem 84 includes A BTD clock input (BTDCLKIN) register 218, a BTD/CRC pipeline (BTDCRCPIP) block 220, a bit density (BTD) decoder 222, a cyclic redundancy check (CRC) decoder 224, a set of 8-bit registers (REGEN 8) 226, 228, 230 and 232, a CRC error (CRCERR) comparator 234, a counter (LDCNT) block 236, and a control signal generator (LDGEN) 238.

Optional bit transition density decoding is performed on data streams 22 (FIG. 1) that have been BTD encoded at the transmitter. This encoding ensures a certain number of transitions in the data stream which helps the sync marker stay locked. A CCSDS recommended code $(h(x)=x^8+x^7+x^5+x^3+1)$ is used to perform BTD decoding.

The data input to the BTDCLKIN register 218 on bus 215 is BTD decoded in the BTD decoder 222 following transfer from registers 218, 226 and 228 and it is stored in the REGEN8 register 230. The decoded data is then fed to the error comparator(CRCERR) 234 along with the output of the CRC decoder 224. CRCERR 234 performs the cyclic redundancy check (CRC) decoding with comparator 234 outputting a CRC error flag signal (CRCERR) on line 240, indicating whether or not a CRC error exists. The LDCNT counter 236 operates to count the number of frames with BTD error while the signal generator LDGEN 238 generates a control signal for the counter 236 as well as the BTD decoder 222.

A BTD offset can be set from 0 to 8 bytes. This offset indicates the number of bytes to skip before decoding starts. For example, for a 32 bit sync marker, the input signal BTDOFFSET input on signal line 223 to the BTD decoder 222 is 0×4. This means that BTD decoding will begin on the fifth byte of the incoming data stream (DATA) on line 215 and will continue until the next start of frame of data is received.

CRC error detection performed in CRC decoder 224 is a method to detect errors in the data stream. The CCSDS recommended polynomial $(g(x)=x^{16}+x^{12}+x^{5}+1)$ as well as the inverse polynomial $(g(x))^{-1}=x^{16}+x^{11}+x^{4}+1)$ are implemented in the CRC block 224. An initial value of the CRC polynomial g(x) is normally initially set, whereupon a "checksum" signal is computed on the data starting from an offset (CRCOFFSET) value fed to the CRC decoder 224 on line 225 and ending at 2 bytes minus the end value. This CHECKSUM is compared against the transmitted "CHECKSUM" in the data frame and an appropriate error bit is set and outputted as a CRC error signal on line 240 if the CHECKSUMs do not match. The frame data output DATAOUT from the BTD/CRC decoding subsystem 84 is provided on bus 231 from REGEN8 register 232.

Similar to BTD, a programmable offset (CRCOFFSET) from 0 to 8 bytes is provided to indicate how many bytes to skip before starting to compute the CRC value. For example, to start computing the CHECKSUM immediately after a 32 bit sync mark, the offset is 0×4. The DATA OUT is shown appearing at the output of the 8 bit register 232 on bus 231. A SEARCH CHECK LOCK FLYWHEEL output is also output on line 241 from the BTDCRCPIP block 220.

Figure 14:
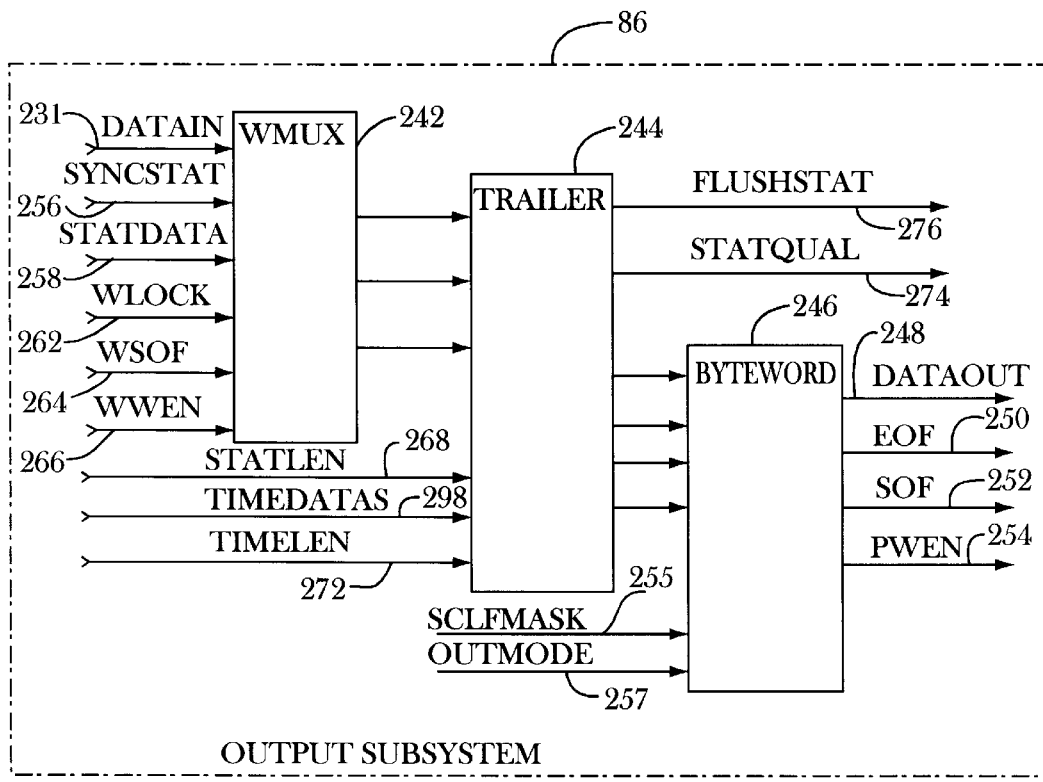
FIG. 14 is an electrical block diagram illustrative of the output subsystem shown in FIG. 6.

Considering now the output subsystem 86 disclosed at FIG. 14, frame data 30 (FIG. 2) from the BTD/CRC subsystem 84 or data from the weather satellite data subsystem 78 is fed to the output subsystem 86, depending upon whether the synchronizer 20 is in the CCSDS mode or in the weather mode. However, the operation of this subsystem is the same, irrespective of which subsystem is providing data. The three main elements in the output subsystem 86 are a multiplexer (WMUX) 242, a trailer (TRAILER) 244 and a byte or word (BYTEWORD) output register 246. The output register 246 outputs data in the form of either bytes or words on a data output bus 248 along with an end of frame (EOF) signal on line 250, a start of frame (SOF) on line 252, with a write enable (PWEN) signal on lead 254, in response to outputs from TRAILER 244, an SCLF mask (SCLFMASK) control signal on line 255 and an outmode (OUTMODE) control signal on line 257.

The multiplexer (WMUX) 242 is responsive to the input data DATAIN appearing on data bus 231, along with status signals for the sync (SYNCSTAT) and data (STATDATA) on lines 256 and 258. In the weather mode, the WMUX 242 receives, in addition to weather data on DATAIN bus 231, a data lock (WLOCK) signal on line 262, a start of frame (WSOF) signal on line 264 and write enable (WWEN) signal on line 266.

The TRAILER block 244 permits up to 8 bytes of frame status or 16 bytes of timecode generated by the timecode subsystem 90 (FIG. 6) to be appended to each data frame in response to status enable (STATEN), time data (TIMEDATA) and time enable (TIMELEN) control signals applied to the lines 268, 270 and 272. The TRAILER 244 also outputs status data quality (STATQUAL) information on line 274 along with a flush status (FLUSHSTAT) signal on line 276 which tells the user that the present frame of data being output is invalid.

Figure 15:
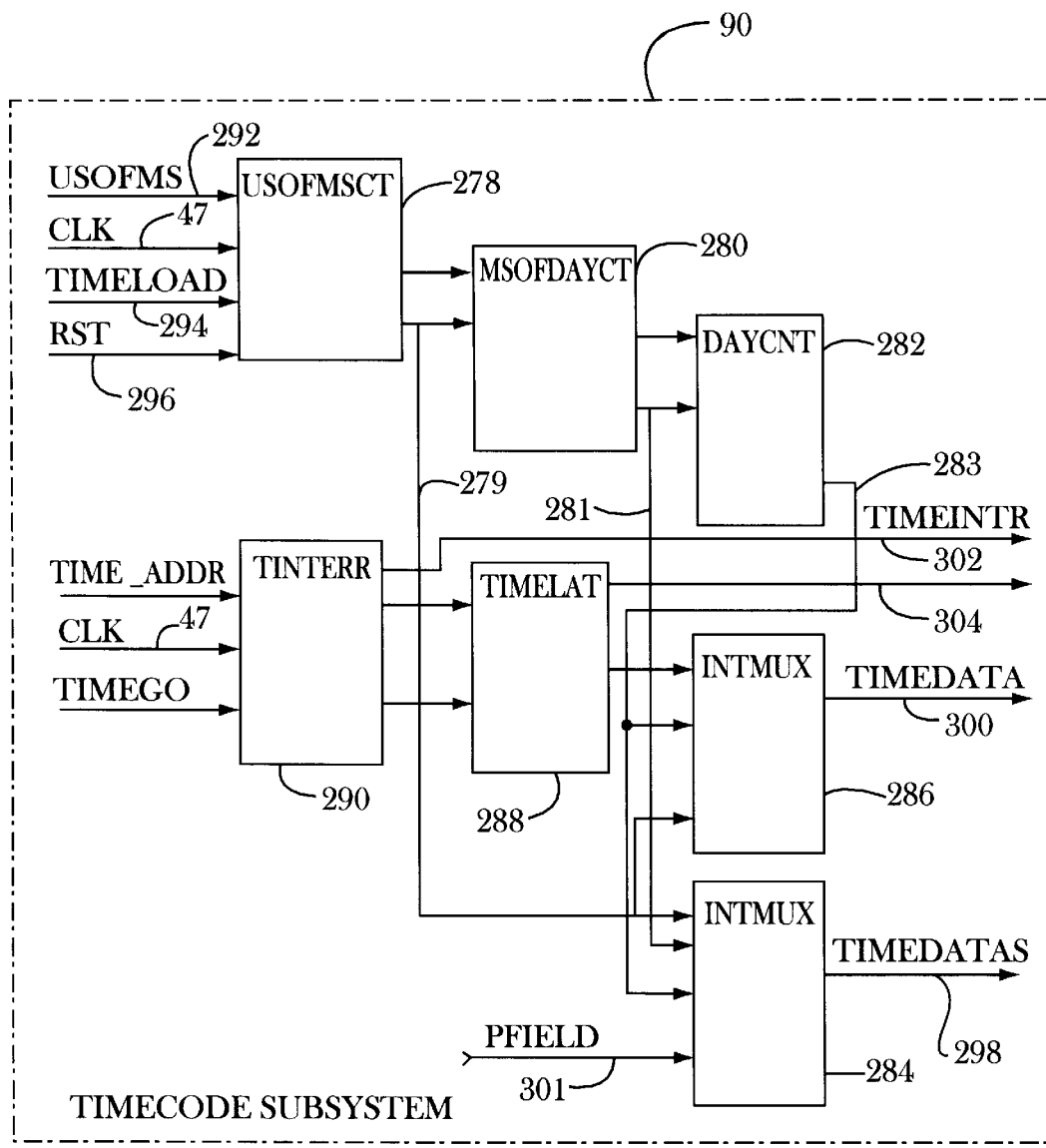
FIG. 15 is an electrical block diagram illustrative of the timecode subsystem shown in FIG. 6.

The next subsystem that needs to be addressed is the timecode interface subsystem 90 shown in FIG. 6, and which is shown in further detail in FIG. 15. Two types of timecodes are provided by the subject invention, an internal timecode, and an external timecode. Referring now to FIG. 15, the timecode subsystem 90 consists of three counters 278, 280 and 282, which generate a microsecond of a millisecond (USOFMSCT) count output on line 279, millisecond of the day (MSOFDAYCT) count output on line 281, and a day count (DAYCNT) output on line 283. The counters 278, 280 and 282 count from a 10 MHz clock signal generated by the clock signal generator 46 shown in FIG. 5, and which is applied via clock signal line 47. The outputs of the three counters 278, 280 and 282 are respectively applied to one multiplexer (INTMUX) 284 of a pair of INTMUX multiplexers 284 and 286. The second multiplexer 286 receives a day count input from line 283 and an output from a time latch (TIMELAT) 288 which is adapted to receive a time interrupt signal from a time interrupt (TINTERR) block 290.

The internal timecode, which is CCSDS day segmented (CDS) is appended to the frame data via the TRAILER 244 (FIG. 14) when programmed via signal line 298 from INTMUX 284. CDS comprises six bytes that are always padded to byte boundaries. The CDS timecode includes 16 bits from the day counter (DAYCNT) 282, 27 bits from the millisecond of the day counter (MSOFDAYCT) 280, and 10 bits from the microsecond of millisecond counter (USOFMSCT) 278. The starting values for these counters are inputted via microsecond of millisecond (USOFMS), time load (TIMELOAD) and reset (RST) control signals entered from the microprocessor 44 on lines 292, 294 and 296, respectively.

The external timecode is user defined and can be up to 16 bytes and reads a predetermined amount of time from an external source, such as a microprocessor 44 shown in FIG. 5, and stores it into the time latch (TIMELAT) block 288. INTMUX 286 decides whether it is going to use the internal or external timecode per the output TIMEDATA signal which appears on output line 300. The INTMUX 284 is responsive to a PFIELD on line 30 command, and determines the type of format and what type of time resolution TIMEDATAS is to be outputted on line 298.

Figure 16:
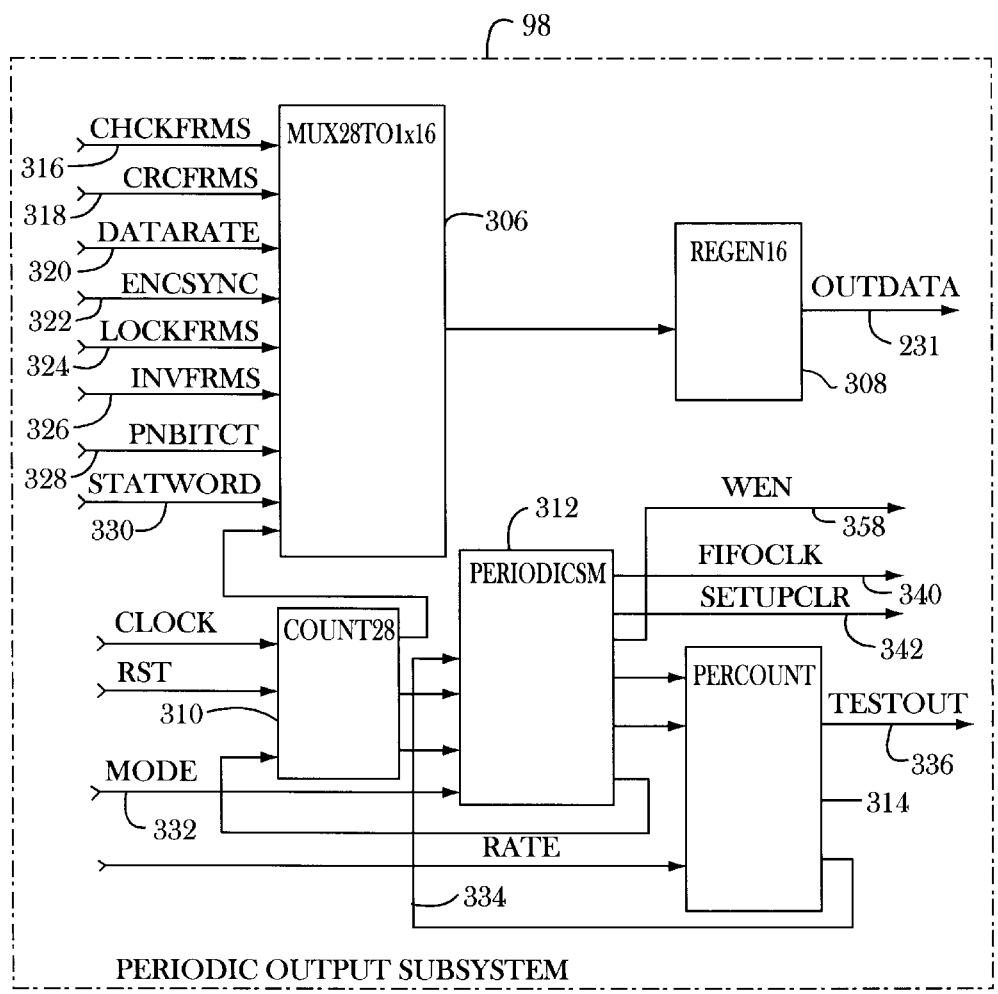
FIG. 16 is an electrical block diagram illustrative of the periodic output subsystem shown in FIG. 6.

Referring now to FIG. 16, shown thereat are the details of the periodic output subsystem 98 which forms part of the control and status block 92 shown in FIG. 6. The subsystem 98 is comprised of a 28:1 multiplexer (MUX28TO1X16) 306, a 16 bit register (REGEN16) 308, a 28 bit counter (COUNT28) 310, a periodic state machine (PERIODICSM) 312 and a periodic counter (PERCOUNT) 314.

The purpose of the periodic output subsystem 100 is to output status information from the status registers 96 (FIG. 7). The multiplexer 306 receives eight information input signals including check frames (CHCKFRMS), CRC frames (CRCFRMS), data rate (DATARATE), (ENCSYNC), lock frames (LOCKFRMS), inverted frames (INVFRMS), pin bit count (PNBITCT), and trailer word status (STATWORD) on lines 316, 318 . . . 330. The multiplexer 306 cycles in a periodic sequence by the output of the counter (COUNT28) 310, which receives a clock (CLOCK) input signal and a reset (RST) signal along with a control signal outputted from the periodic state machine (PERIODICSM) 312. The PERIODICSM 312 determines the frequency of the status outputs in response to an operational mode input signal on line 332 and an output from the periodic counter (PERCOUNT) 314 via line 334. The periodic counter 314 also sends out a test control signal (TESTOUT) 336. The PERIODICSM 312 outputs a write enable (WEN), a first-in, first-out clock (FIFOCLK) signal, and a set up clear (SETUPCLR) signal which appear on lines 338, 340 and 342. The multiplexed status outputs (OUTDATA) are fed from the register (REGEN16) 308 on signal line 231.

The periodic output subsystem 98 essentially operates in two distinct modes. In one mode, the subsystem is software controlled. In this mode, the contents of the status registers 96 (FIG. 7) are written out as OUTDATA to the WMUX 242 (FIG. 14) via bus 231 and operates independently of any data flow. In the second mode, the subsystem outputs status data on bus 231 every N frames, where N is some number in the range between one frame to 64 K frames.

Along with the periodic output subsystem 98 in the control and status section 92 (FIG. 6) is a set of 12 counters included in a cumulative quality counter subsystem 100.

Figure 17:
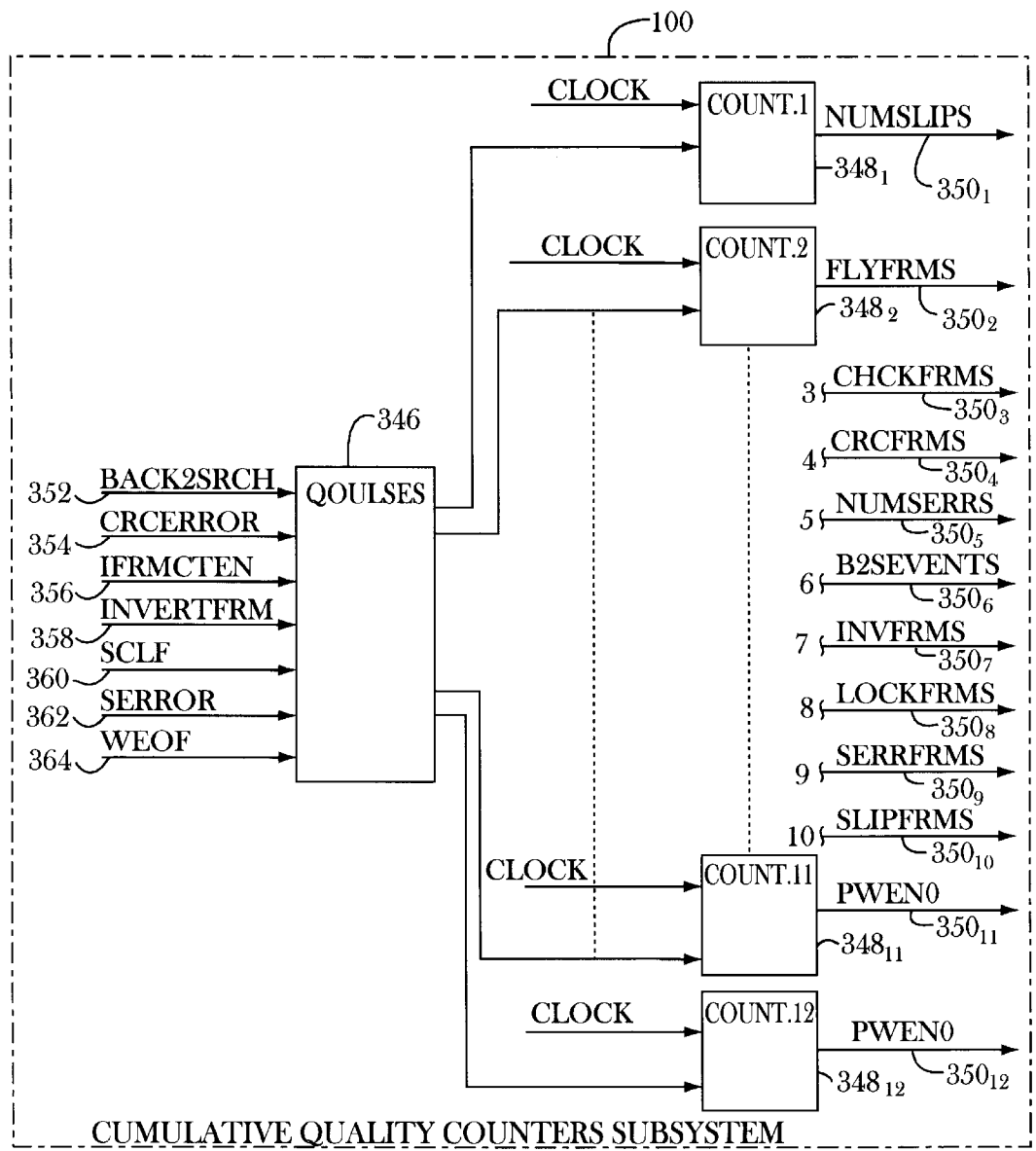
FIG. 17 is an electrical block diagram illustrative of the cumulative quality counters subsystem shown in FIG. 6.

As shown in FIG. 17, the cumulative quality counter subsystem 100 is comprised of a control block (QOULSES) 346 and 12 counters $348_1 \ldots 348_{12}$ which operate in response to command outputs from QOULSES 346 to output the number of counted lock frames, check frames, flywheel frames, frames with sync errors, frames with slip bits, frames with CRC errors, inverted frames, back-to-search events, sync errors and slip bits. The QOULSES 346 responds to requests by the microprocessor 14 (FIG. 5) via seven input signals shown as: back-to-search (BACK2SRCH), (CRC ERROR), inverted frame count enable (IFRMCTEN), inverted frames (INVERTFRM), search check lock flywheel (SCLF), serial frame error (SERROR) and end of frame (WEOF) which appear on signal lines 352, 354, . . . 364.

Basically, the cumulative quality counter interface 100 and the periodic output control 98 implement housekeeping functions for the PIFS chip 20. The interface from the external microprocessor 44 (FIG. 5) comprises the 8 bit bus 70 and the 32 bit bus 48 and allows the user to set/reset operational parameters and read status parameters to control/determine the behavior of the PIFS 20.

Figure 18:
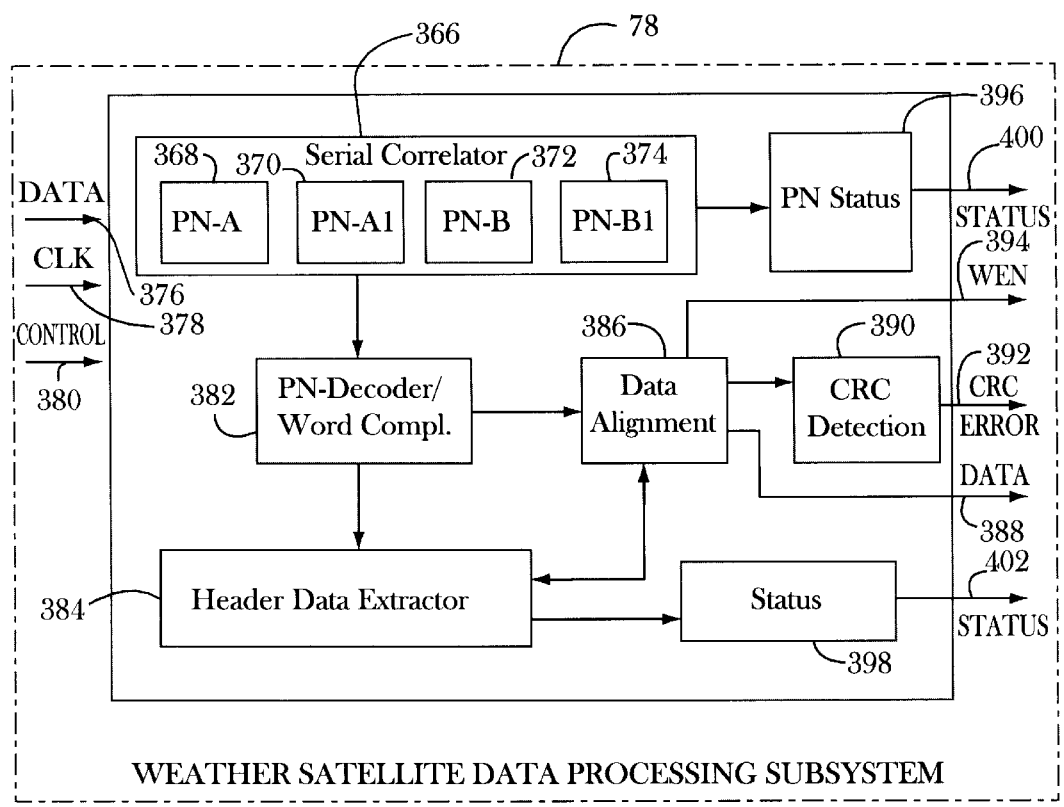
FIG. 18 is an electrical block diagram illustrative of the weather satellite data processing subsystem shown in FIG. 6.

Turning attention now to the weather satellite data processing (WSDP) subsystem 78 shown in FIG. 6, a block diagram of this subsystem is shown in FIG. 18. The WSDP 78 is used to process weather satellite data, as opposed to telemetry data, for several satellite systems, including, for example, DMSP and TIROS, GMS GOES-GVAR, and METEOSAT.

As shown in FIG. 18, the WSDP subsystem 78 includes a serial data correlator 366 including four pseudo noise (PN) generators (PN-A) 368, (PN-A1) 370, (PN-B) 372 and (PN-B1) 374. The correlator compares the respective PN sequence generated by the PN generators 368, 370, 372 and 374 against an incoming serial weather data steam DATA appearing on line 376. The four pseudo noise (PN) sequences have maximum length of 64 K bits, with two of the four PN sequences being the inverse (I) of the first two sequences A and B, so that two different PN sequences and their inverted form can be correlated. The pseudo noise generators 368, 370, 372 and 374 in effect implement a polynomial corresponding to the same pseudo noise pulse stream that is being generated by the weather satellite.

Once the correlator 366 finds the start bit of the weather input data (DATA), the correlated serial data enters a decoder/work complement (PN-DECODER/WORDCOMPL.) block 382 which decodes and complements the correlated data. Once the correlated data is decoded and complemented, if necessary, the data passes into a HEADER DATA EXTRACTOR 384 as well as a DATA ALIGNMENT block 386. The header is read three times and a majority decision is made in the data extractor 384 to decide the word length and the frame length of the incoming data.

The data alignment block 386 packs the serial data stream into a desired word size which can be in the range of two bits per word to 16 bits per word, with the data being output as bytes regardless of word size on data bus 388. If the word size is less than 8 bits, then the uppermost bits of the byte are filled with 1's or 0's. The data processed in the data alignment block 386 is also passed to a CRC DETECTION block 390. Again, the detector 390 detects error in the data stream; however, a different polynomial is set and a CRC CHECKSUM is computed on the data, starting from the first bit of the data, and ending at 2 bytes minus the 12 bytes of a particular block of data.

CHECKSUM is then compared against the transmitted CHECKSUM and an appropriate error bit is set in the status field via line 392 if the CHECKSUMs do not match. A word enable (WEN) signal is also generated by the data alignment block 386 and appears on output line 394. Two status registers 396 and 398 are also included in the WSDP subsystem 78, one being coupled to the correlator 366 and one being coupled to the header data extractor 384. Status output signals appear respectively on signal leads 400 and 402. The data output from the weather satellite data processing subsystem 78 is fed via bus 388 to the input bus 231 to the output subsystem 86, shown in FIG. 14, so that the output subsystem outputs either weather data or telemetry data, which can be used as valid data suitable for processing, for example, by Reed-Solomon error correction device 30 shown in FIG. 4, which is then fed to a data user, as shown in FIG. 1.

Referring now to the data flow charts shown in FIGS. 19–29, they are provided to further illustrate the flow of data through the various subsystems shown and described above.

Figure 19A:
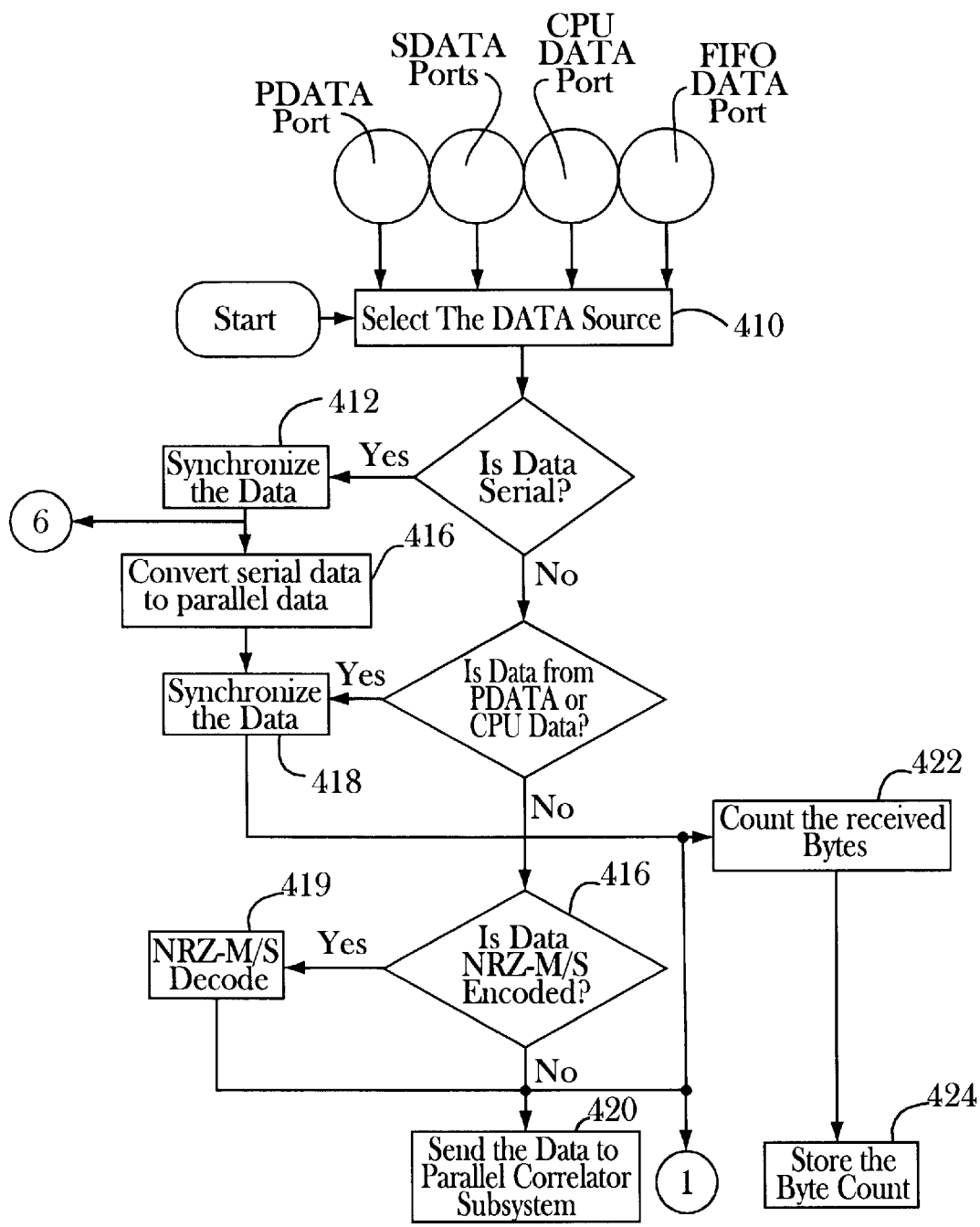
FIGS. 19A and 19B are flow charts illustrative of the operation of the front end subsystem shown in FIG. 8.
Figure 19B:
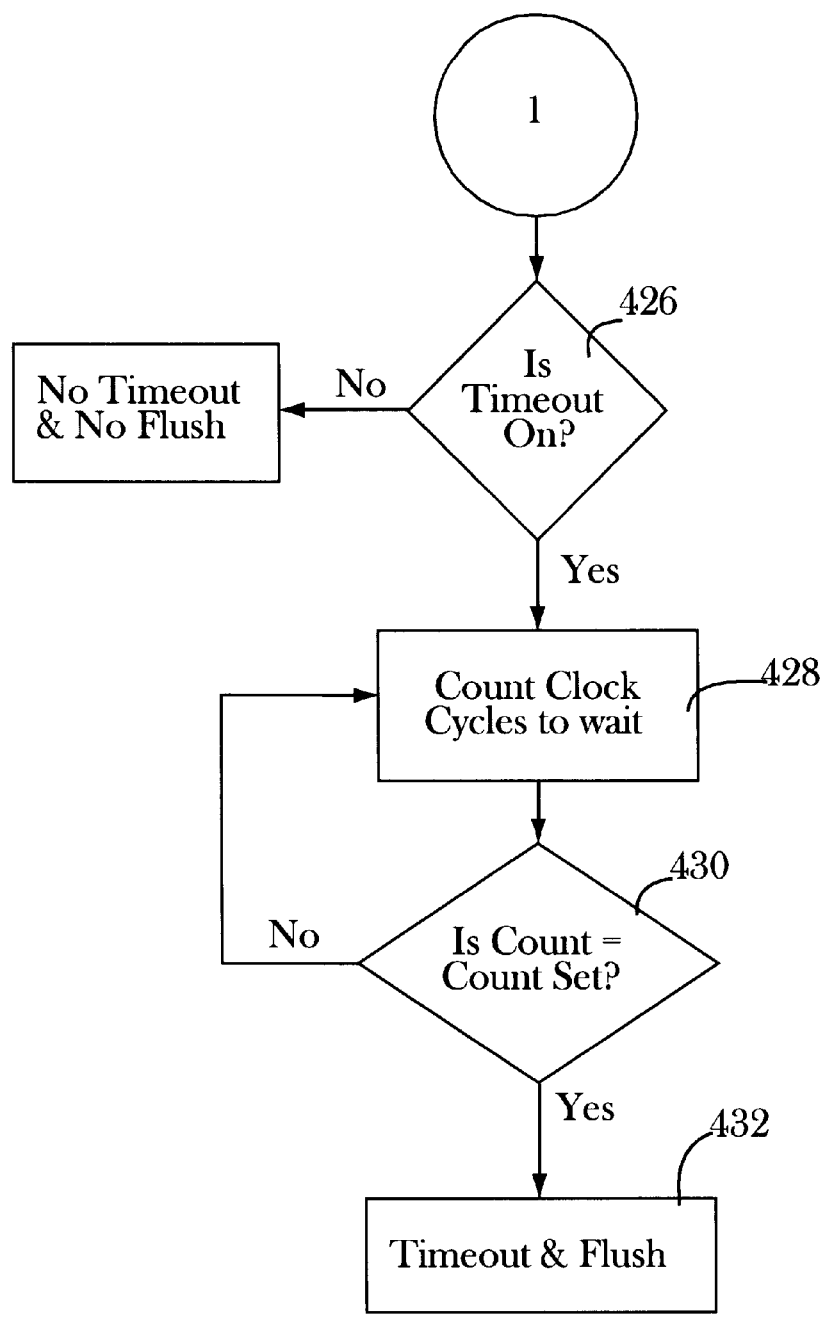

FIGS. 19A and 19B comprise a flow chart for the front end subsystem 74. As shown, the first step in performing synchronization in accordance with this invention is to select the data source from the PDATA input port, the SDATA input port, CPU DATA input port or the FIFO DATA input port as shown by reference numeral 410. If the input data is serial data or has been serialized, it is first synchronized to the system clock as shown by step 412. The synchronized serial data is then converted to parallel data shown by reference numeral 414 and again synchronized to the system clock at step 418. The synchronized parallel data is then sent to the parallel correlator subsystem 76 shown by reference numeral 20. Next the number of parallel bytes of data are counted and stored, shown by reference numerals 422 and 424. The synchronized parallel data is next subjected to a TIMEOUT determination as shown by reference numeral 426 in FIG. 19B. If a TIMEOUT sequence has been initiated and the clock count exceeds a set count per step 428 and 430, a TIMEOUT and FLUSH command is generated as shown by reference numeral 432.

If on the other hand the input data is parallel data or CPU data, it is sent to the parallel correlator subsystem per step 420 unless it is NRZ-M/S decoded, in which case it is decoded first as shown by step 419 before being sent to the parallel correlator subsystem.

Figure 20:
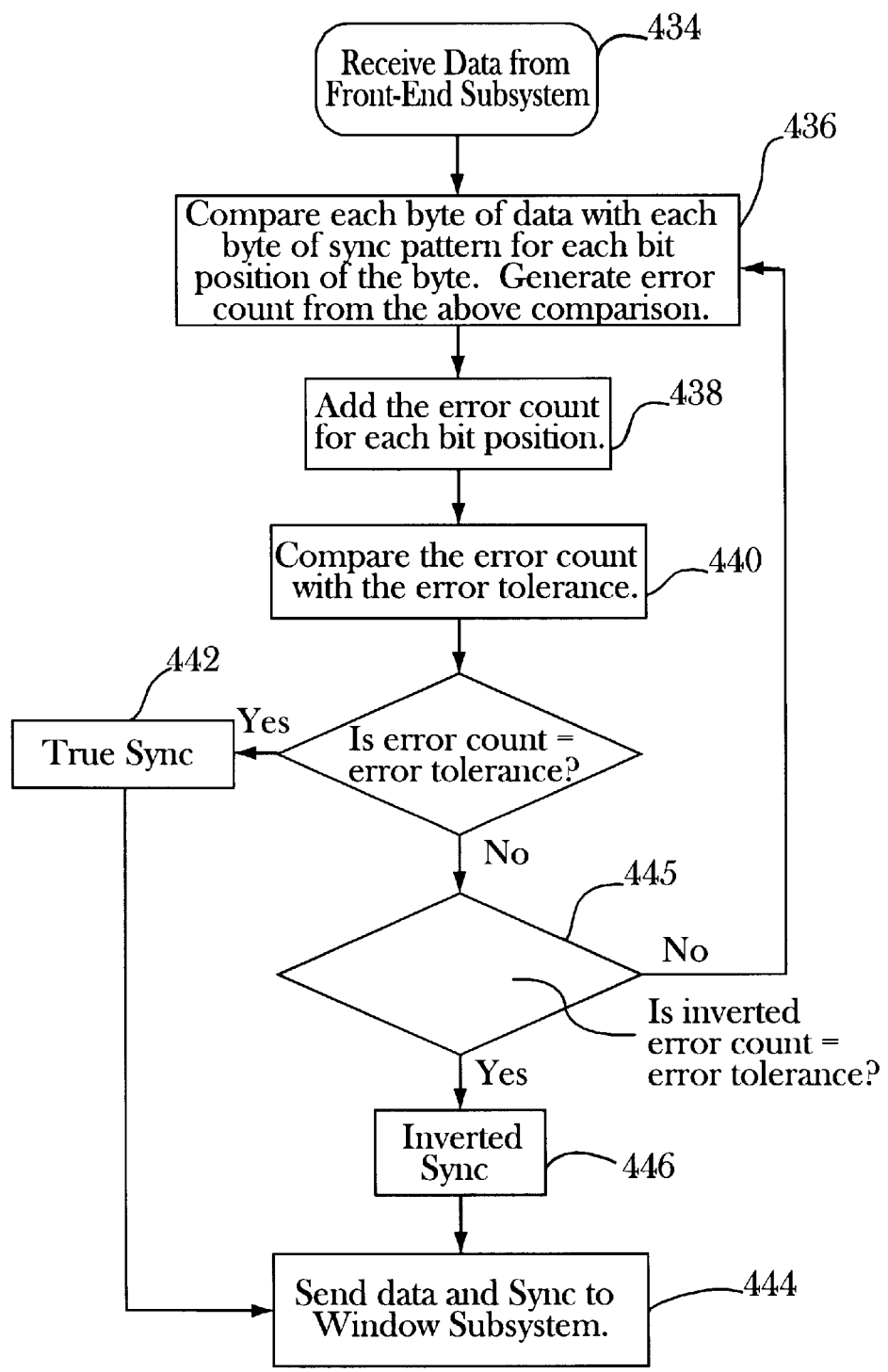
FIG. 20 is a flow chart illustrative of the operation of the parallel correlator subsystem shown in FIG. 9.

Next, the flow chart for the parallel correlator subsystem 76 shown in FIG. 9 is depicted in FIG. 20. As shown, parallel data is received from the front end subsystem 74 in 8-bit bytes via bus 118 (FIG. 9) per step 434, whereupon each byte of input data is compared with each byte of the sought after sync marker pattern for each bit position 1 through 8 of the byte and an error count is generated per step 436. The error count for each bit position is added in the PIPEADD $136_1 \ldots 136_8$, shown by reference numeral 438, and compared with a preset error tolerance per step 440. If the error count is equal to the tolerance, a true sync marker pattern is indicated as being received per step 442, whereupon the data and the sync marker pattern are sent to the window subsystem 80 per step 444. If the error count is not equal to the error tolerance, a second query 445 is made to determine if the inverter error count is equal to the error tolerance. If the answer is negative, the comparison step 436 is repeated. If the inverted error count is equal to the tolerance, the inverted sync marker is inverted per step 446 and sent to the window subsystem as shown.

Figure 21A:
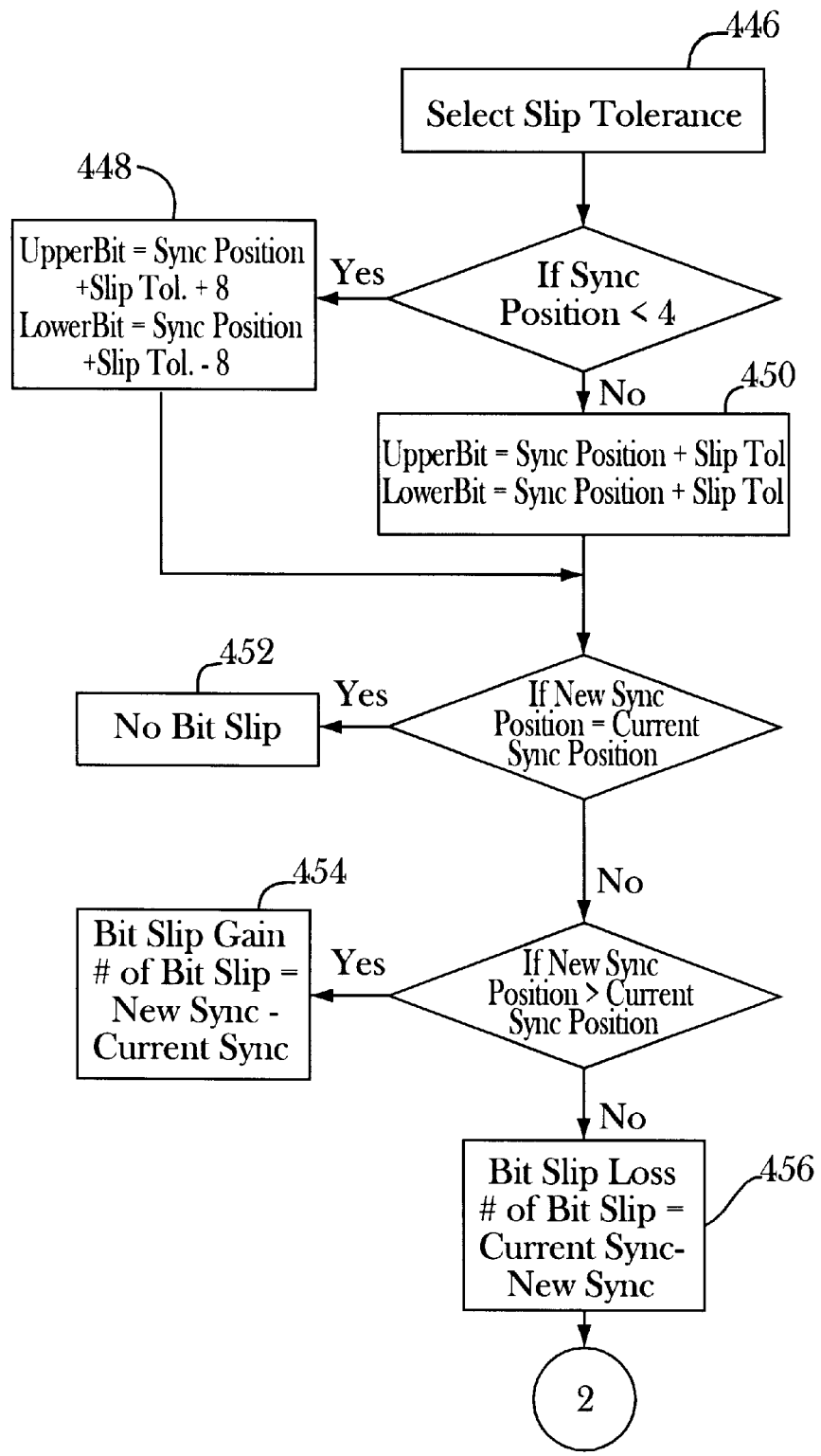
FIGS. 21A–21C are flow charts illustrative of the operation of the window subsystem shown in FIG. 10.
Figure 21B:
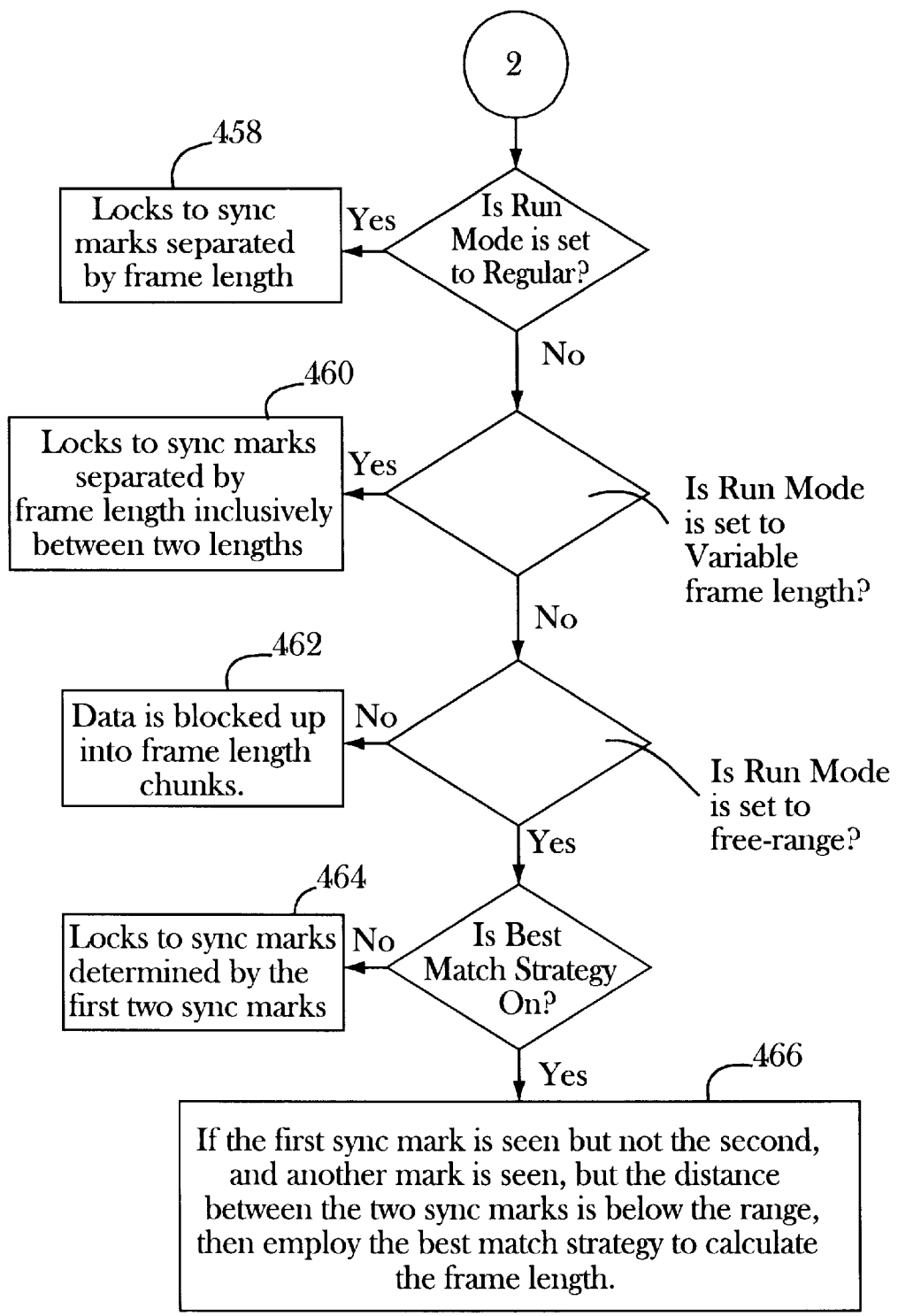
Figure 21C:
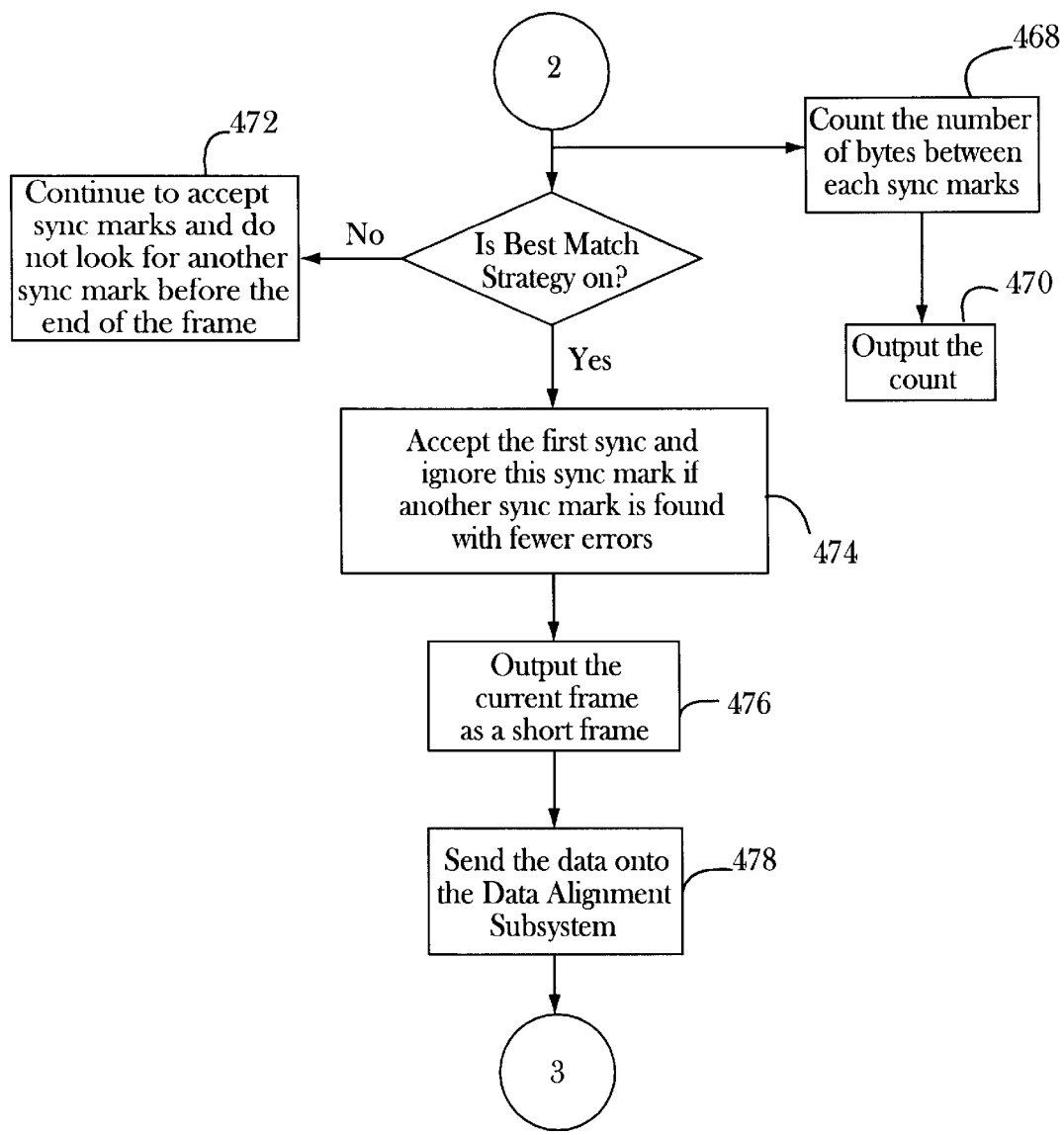

Considering now the flow chart for the window subsystem, reference is now made to FIGS. 21A–21C and uses the synchronization strategy shown in the search-check-lock-flywheel (SCLF) state diagram shown in FIG. 11. As shown in FIG. 21A, a bit slip tolerance is first selected, as shown by reference numeral 446. If the position of the sync marker is less than 4 bits, 8 bits are added to the upper and lower bits of the sync marker plus a slip tolerance as shown by reference numeral 448. If the sync marker position is greater than 4 bits, then slip tolerance bits are added to the upper and lower bits of the sync marker position per step 450. If the new sync marker position is equal to the current sync marker position, then there is an indication that there is no bit slip as evidenced by reference numeral 452. If the new sync position is more than the current sync position, then the bit slip gain is noted per step 454. If the new sync position is less than the current sync position, then the bit slip loss is noted per step 456.

Moving on to FIG. 21B, if the RUNMODE is set to the regular mode, a lock mode is entered into where the sync markers are separated by the frame length per step 458 (FIG. 21B). If the RUNMODE is set to the variable frame length mode, then the sync markers are locked by the frame length designated per step 460. If the run mode is set to a free range mode, then the data is blocked into frame length chunks. If the best match strategy is not employed, locking to sync markers is determined by the first two sync marks per step 464. If the best match strategy is employed, if the first sync marker is seen but not a second, and a subsequent mark is seen, but the distance between the two sync marks is below a predetermined range, then the best match strategy is used to calculate the frame length per step 466.

With reference to FIG. 21C, the window subsystem flow chart parallels after step 456 shown in FIG. 21A, whereupon the number of bytes between each of the sync markers is counted and outputted per steps 468 and 470. If the best match strategy is not employed, sync markers continue to be accepted and another sync marker pattern is not looked for before the end of a data frame per step 472. If the best match strategy is ON, the first sync marker is accepted, except if another sync marker is found with fewer errors, as indicated by reference numeral 474. The current frame is outputted as a short frame if necessary per step 476 and the data is sent to the data alignment subsystem 82 shown in FIG. 12 as shown by reference numeral 478.

Figure 22:
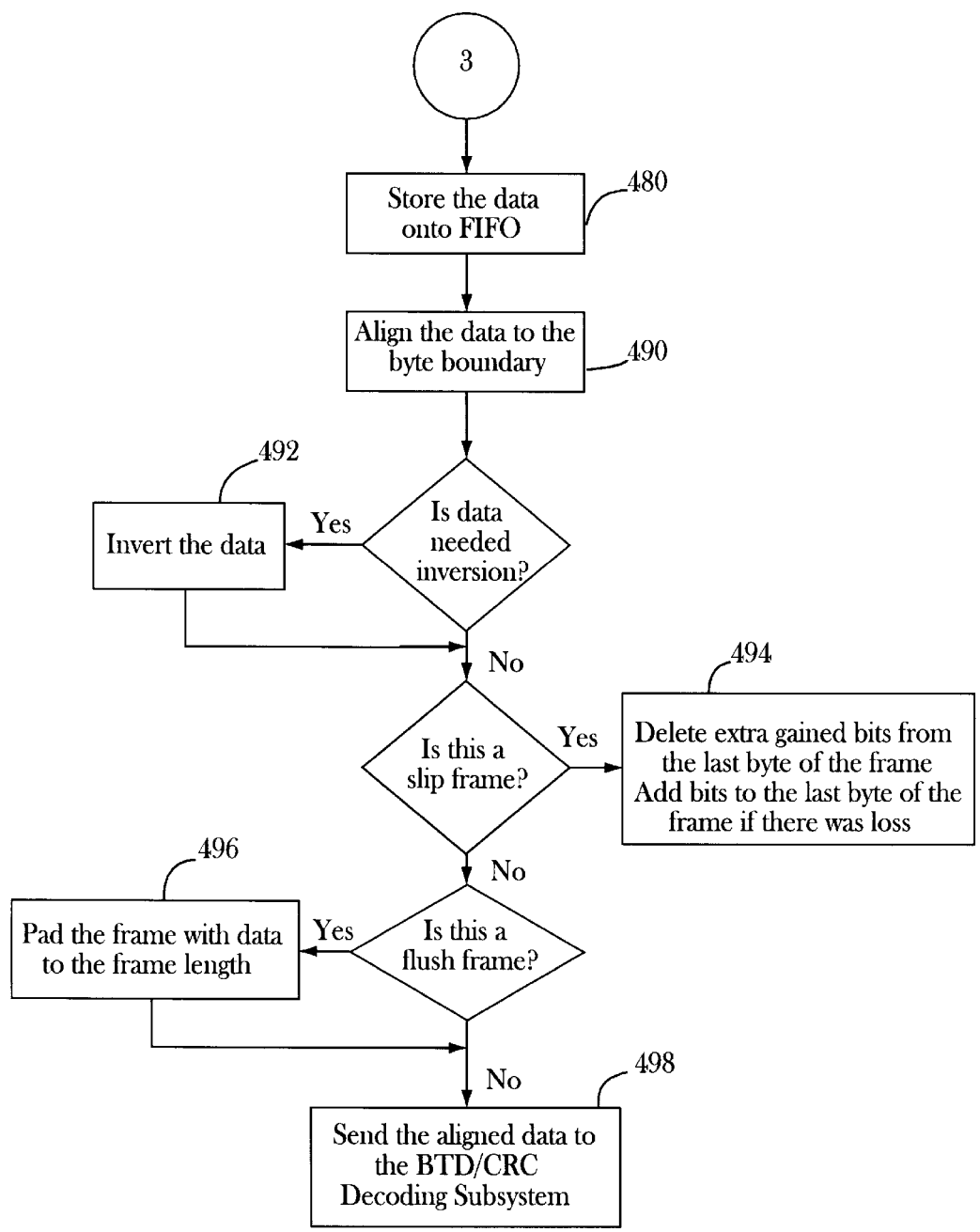
FIG. 22 is a flow chart illustrative of the operation of the data alignment subsystem shown in FIG. 12.

The flow chart for the data alignment subsystem 78 is shown in FIG. 22 where the data inputted from the data alignment subsystem is first stored on a first-in, first-out (FIFO) basis in the memory 198 (FIG. 12) as shown by reference numeral 480. Next, the data is aligned to the byte boundaries of a data frame as indicated by reference numeral 490, and the data is inverted, if need be, per step 492. If the current data frame constitutes a slip frame, then the extra gain bits are deleted from the last byte of the frame. However, bits are added to the last byte of the frame if there was a loss per step 494. If the data frame constitutes a FLUSH frame, the frame is padded with data to the required frame length as shown by reference numeral 496, otherwise the aligned data is sent to the BTD/CRC decoding subsystem 84, shown in FIG. 13, per step 498.

Figure 23:
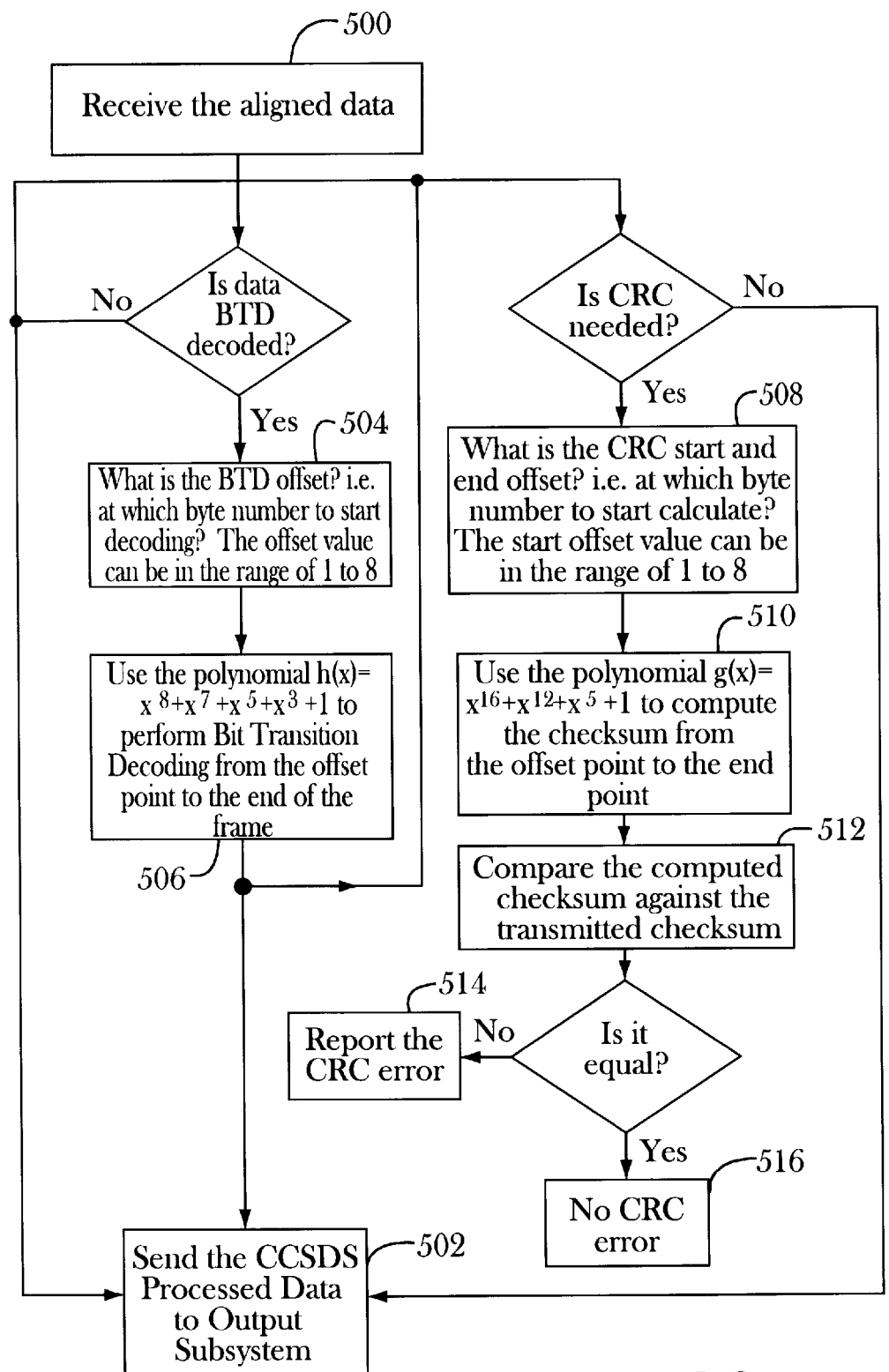
FIG. 23 is a flow chart illustrative of the operation of the BTD/CRC decoding subsystem shown in FIG. 13.

Referring now to FIG. 23, shown thereat is the flow chart for the BTD/CRC decoding subsystem of FIG. 13 and which is first evidenced by a reception of the aligned data from the data alignment subsystem 82 per step 500. If the incoming data stream was not optional bit transition density (BTD) encoded at the transmitter, it is immediately forwarded on to the output subsystem 86, shown in FIG. 14, per step 502. If no cyclic redundancy check (CRC) is needed, it is also sent to the output subsystem. On the other hand, in the event that BTD decoding is necessary, then the BTD offset is determined at step 504 and the CCSDS polynomial h(x) is used to perform bit transition decoding from the offset point to the end of the data frame, as shown by reference numeral 506. This data is then sent to the output subsystem 86 (FIG. 14).

As noted above, determination is also made as to whether or not CRC is needed. If it is needed, then a determination is made as to which byte to start error correction shown by step 508, using the recommended CCSDS polynomial g(x) wherein the CHECKSUM is computed from the offset point to the end point as shown by reference numeral 510, after which the computed CHECKSUM is compared against the transmitted CHECKSUM per step 512. The CRC error is then reported following the comparison shown by step 514, or else no CRC error is reported per step 516.

Figure 24:
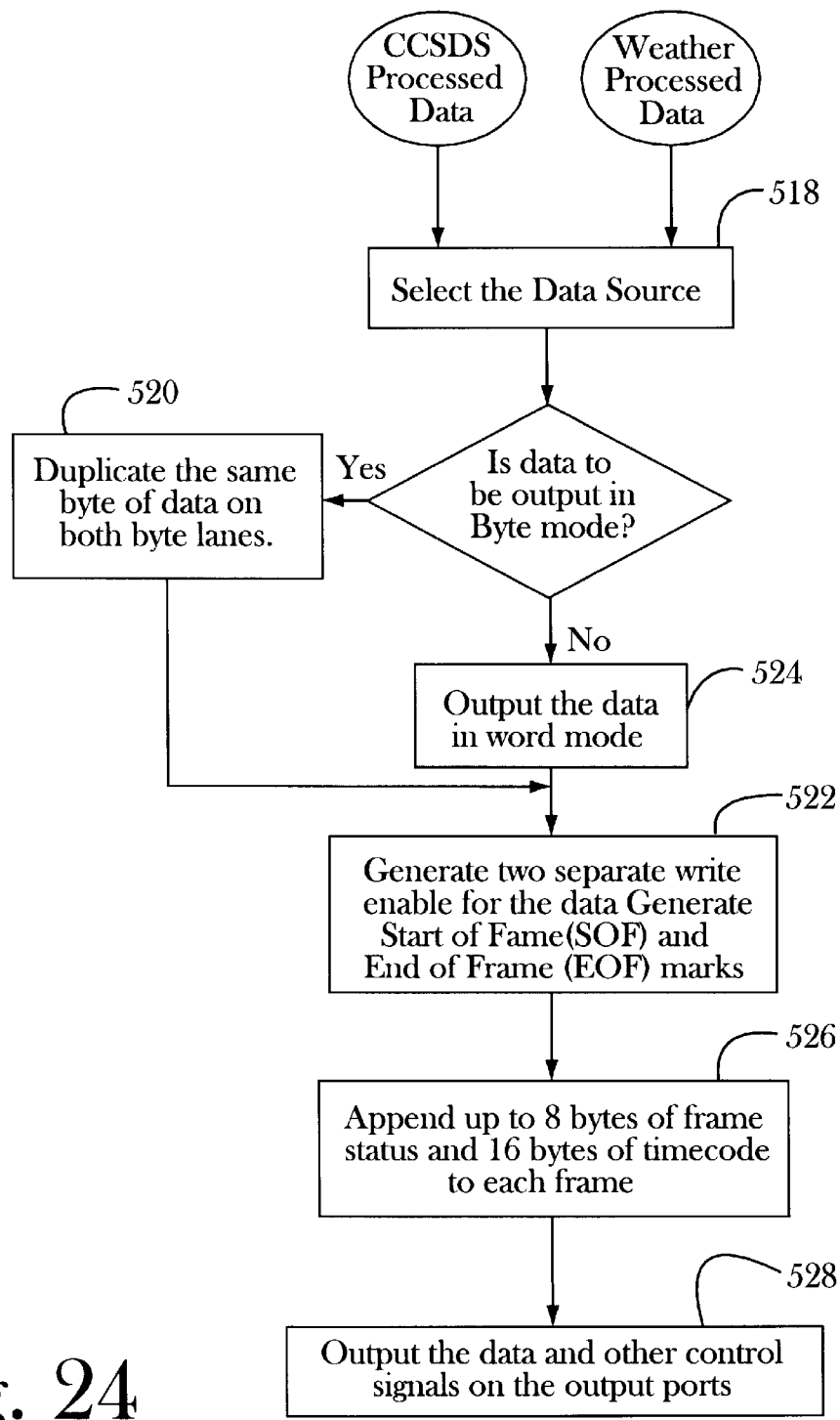
FIG. 24 is a flow chart illustrative of the operation of the output subsystem shown in FIG. 14.

Next, the flow chart of the output subsystem is illustrated in FIG. 24. As shown, either CCSDS processed data or weather processed data is fed to the output subsystem 86 shown in FIG. 14 per step 518. If data is to be output in the "byte mode", the same byte of data is duplicated on both byte lanes(?) as shown by reference numeral 520, whereupon two separate write enable (WEN) signals for data are generated along with a start of frame (SOF) and end of frame (EOF) control signals as shown by reference numeral 522. The same step is entered into if the output data is to be output in the "word mode" as shown by reference numeral 524. Next, up to 8 bytes of frame status and 16 bytes of timecode are appended to each data frame, as indicated by step 526, whereupon the data and other control signals are output on the output ports of the output subsystem 86 as indicated by step 528.

The flow chart for the weather satellite data processing system 78 shown in FIG. 18 will now be considered, and is shown in FIGS. 25A–25D. Beginning with FIG. 25A, and reference numeral 530, synchronized serial data is obtained from the front end subsystem following step 412 shown in FIG. 19A. The required polynomial for weather data from a satellite is next programmed in the pseudo noise (PN) sequence generators 368, 370, 372 and 374 shown in FIG. 18 in accordance with step 532. Next the PN generators are fed the income data stream as shown by step 534 and initialized. The output of the PN generators is compared with the incoming data stream as shown by reference numeral 536 where the count of consecutive matches are made per step 538. If the number of consecutive matches is equal to a predetermined program count, the PN generators are disconnected from the incoming data stream and generate the remainder of the PN sequence shown by reference numeral 540 in FIG. 25B.

Next, the output of the PN generators 368, 370, 372 and 374 are compared with the input data stream and the number of mismatches are stored, as indicated by reference numeral 542. Then the 16 bit output word generated by the PN generators is compared with the stored sync pattern per step 544. If it is equal and the data is encoded, it is decoded per step 546 shown in FIG. 25C.

Figure 25A:
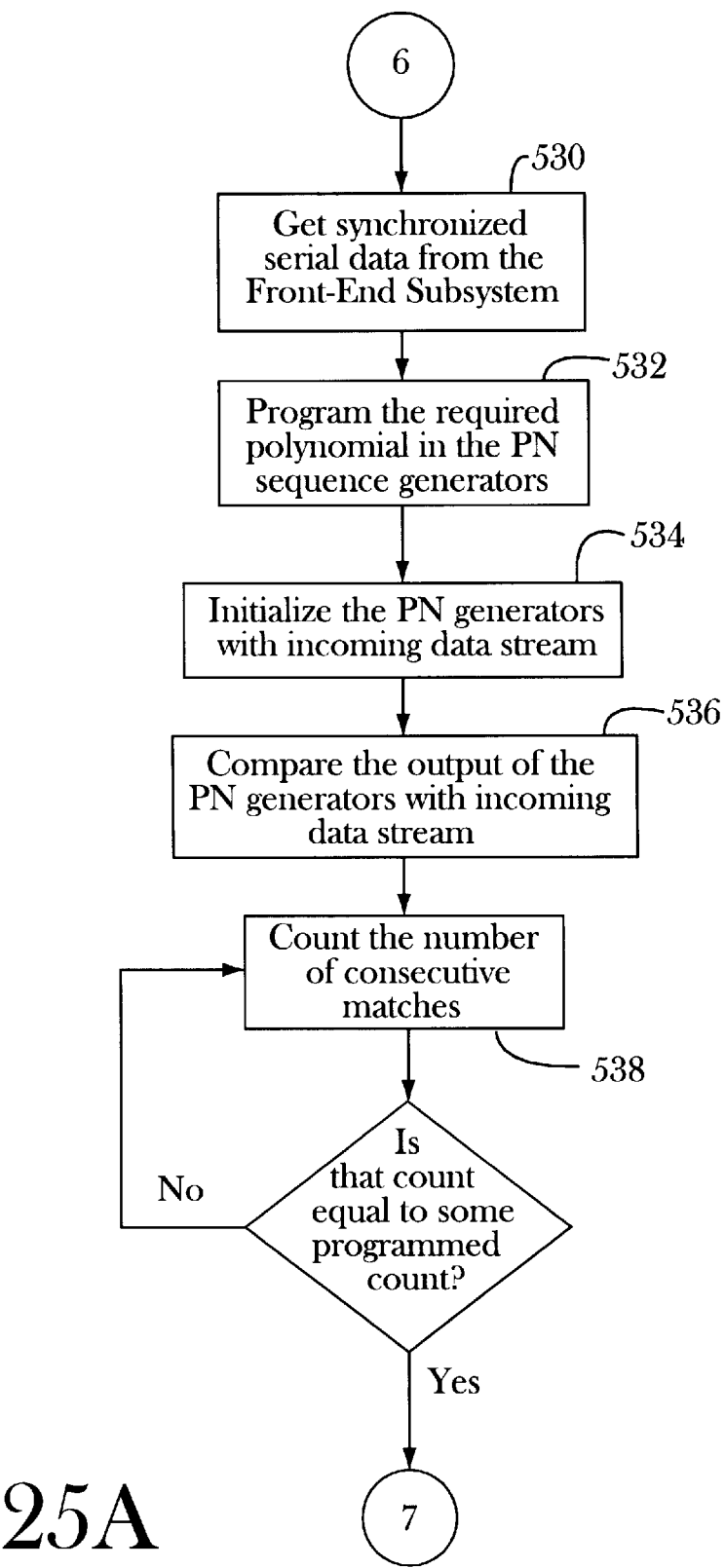
FIGS. 25A–25D are flow charts illustrative of the weather satellite data processing subsystem.
Figure 25B:
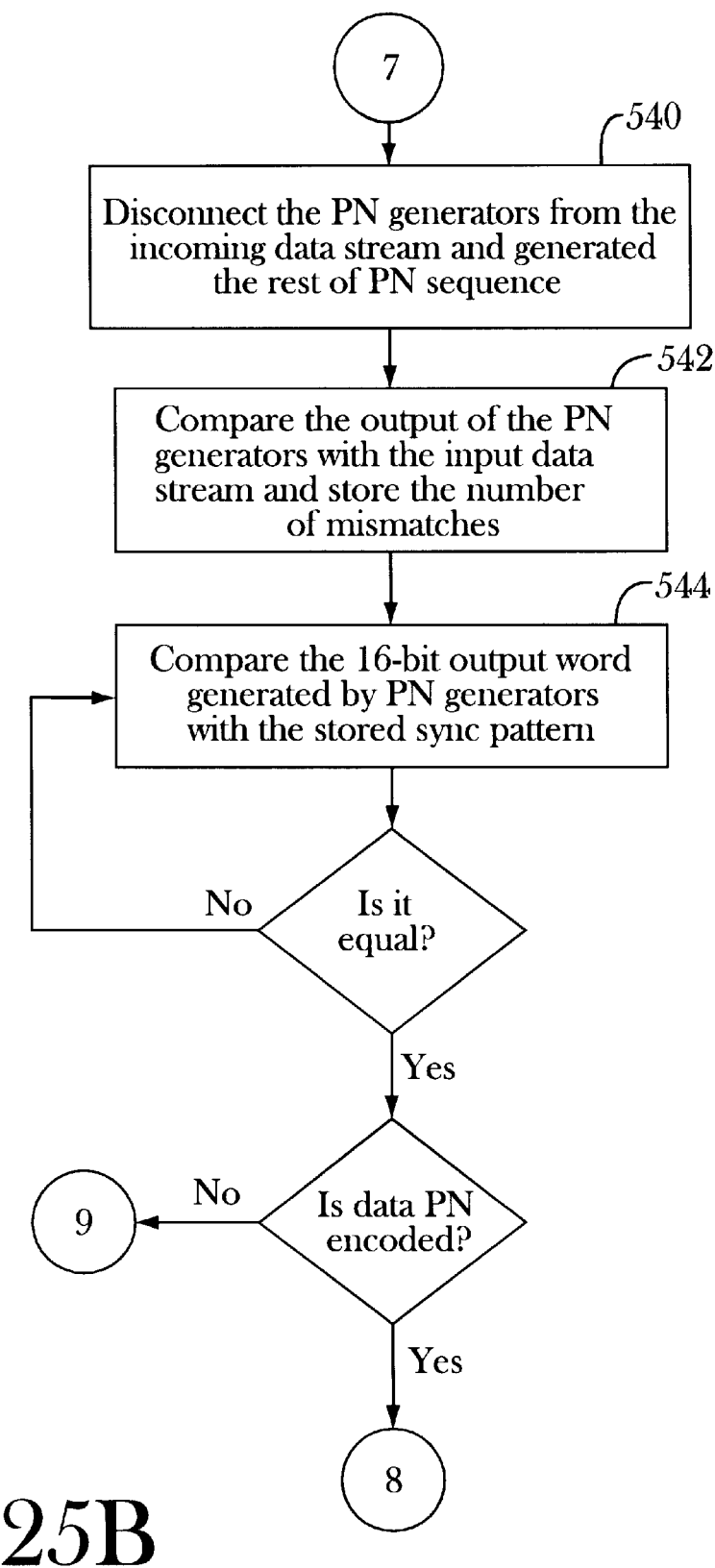
Figure 25C:
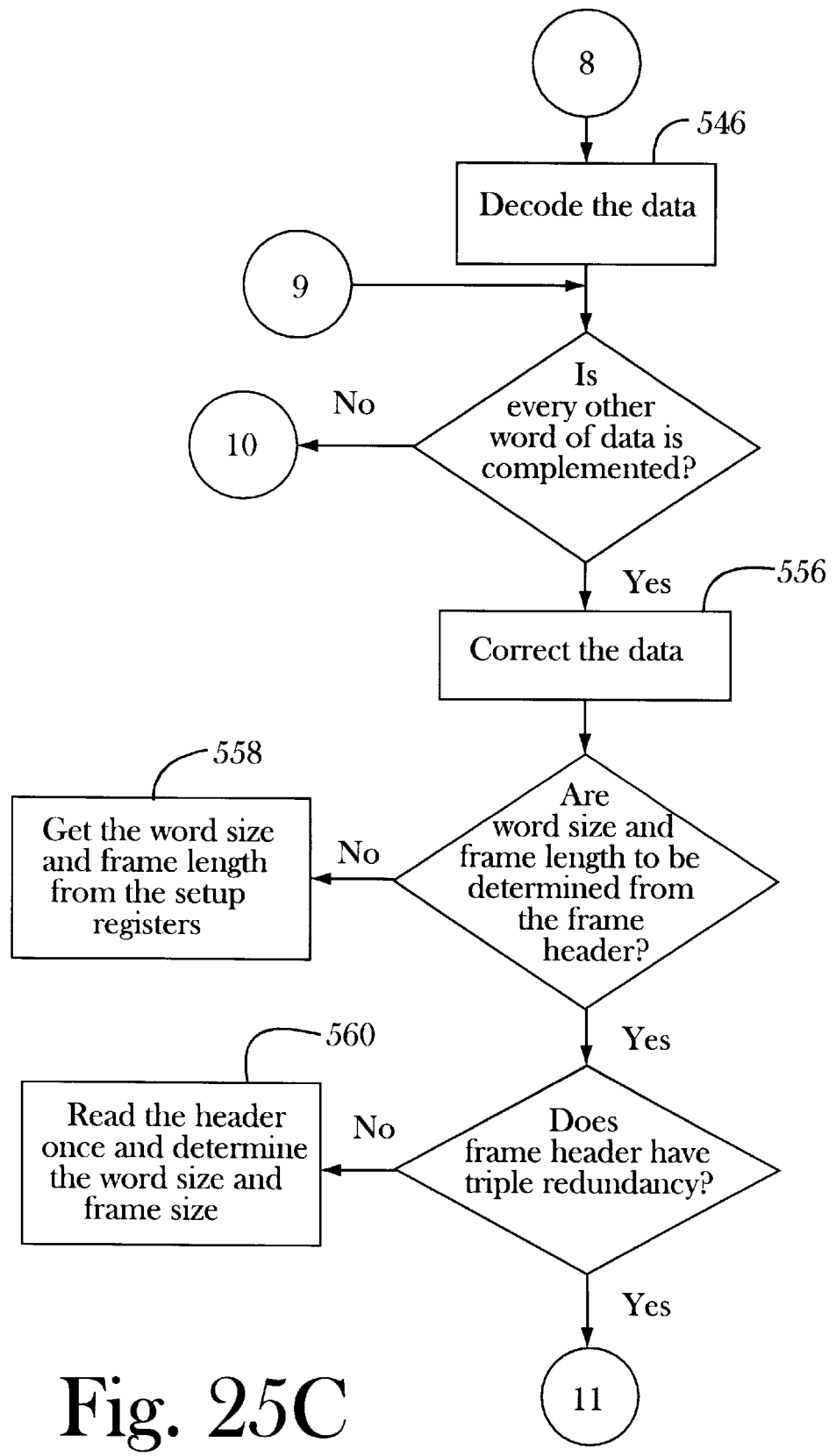
Figure 25D:
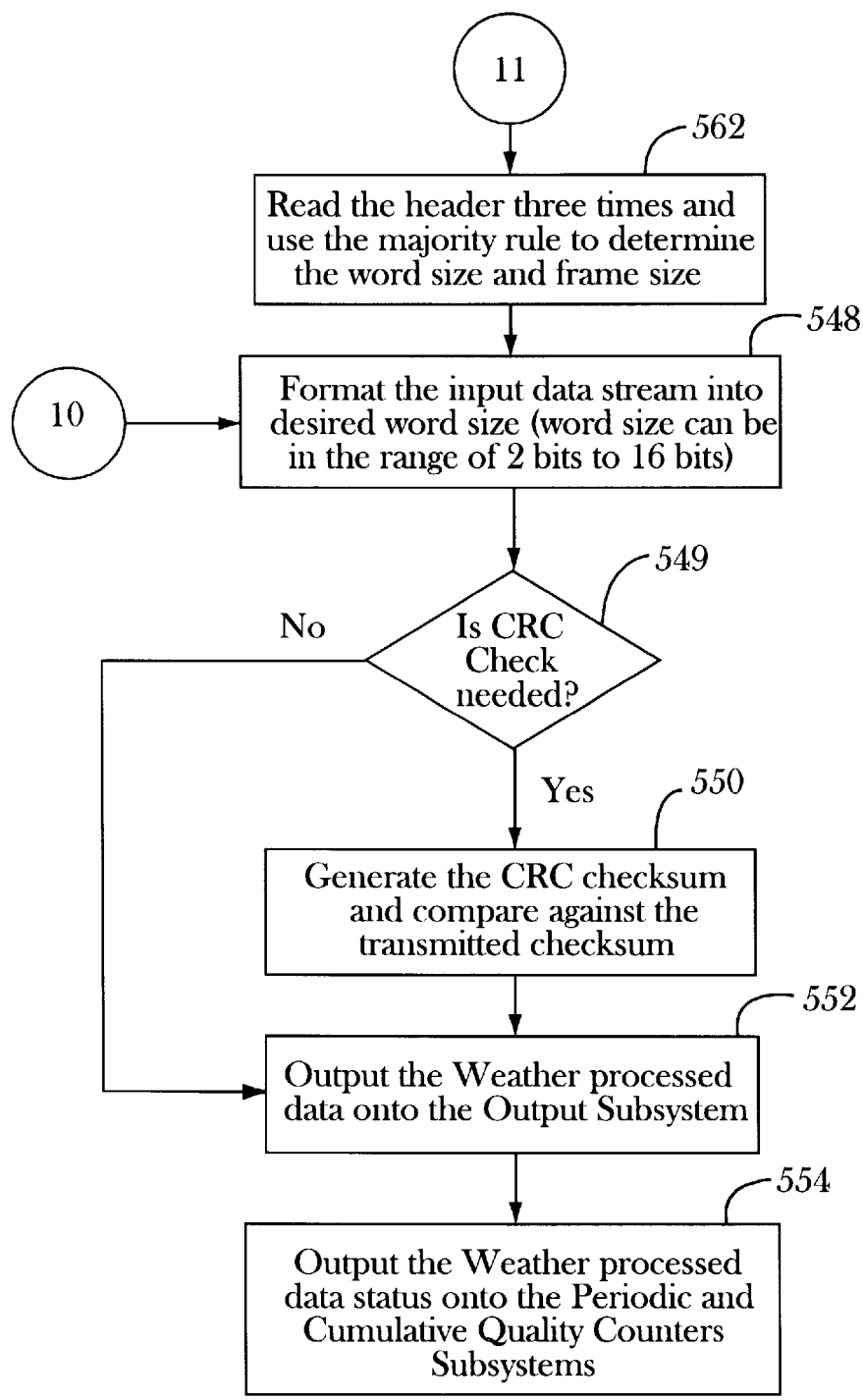

If the data is not decoded and every other word of data is not complemented, then the data of the input data stream is formatted into the desired word size, which can be in the range between 2 bits and 16 bits, as shown by reference numeral 548 shown in FIG. 25D after which a decision is made to see if a CRC check is required at 549. If no CRC check is needed, the formatted data stream is outputted to the output system 86 shown in FIG. 14, as indicated by step 552 and then the weather processed data status is output onto the periodic and cumulative quality counter subsystem 98 and 100 shown in FIGS. 17 and 16 in accordance with step 554. If a CRC check is needed, a CRC CHECKSUM is generated and compared against the transmitted CHECKSUM as shown in step 550 before outputting the weather processed data per step 552.

Returning to FIG. 25C, if every other word of decoded data provided by step 546 is complemented, then the data is corrected as shown by reference numeral 556 in FIG. 25C, whereupon word size and frame length are obtained from the set up registers 94 (FIG. 7) if necessary, in accordance with step 558. Otherwise, if the word size and frame length is to be determined from the frame header, then the header is read once to determine the word size and frame size as shown by reference numeral 560. If the frame header has triple redundancy, it is read three times and majority rule is used to determine the word size and frame size per step 562 shown in FIG. 25D. The input data stream is formatted per step 548 and output per steps 549–554 described above.

Figure 26A:
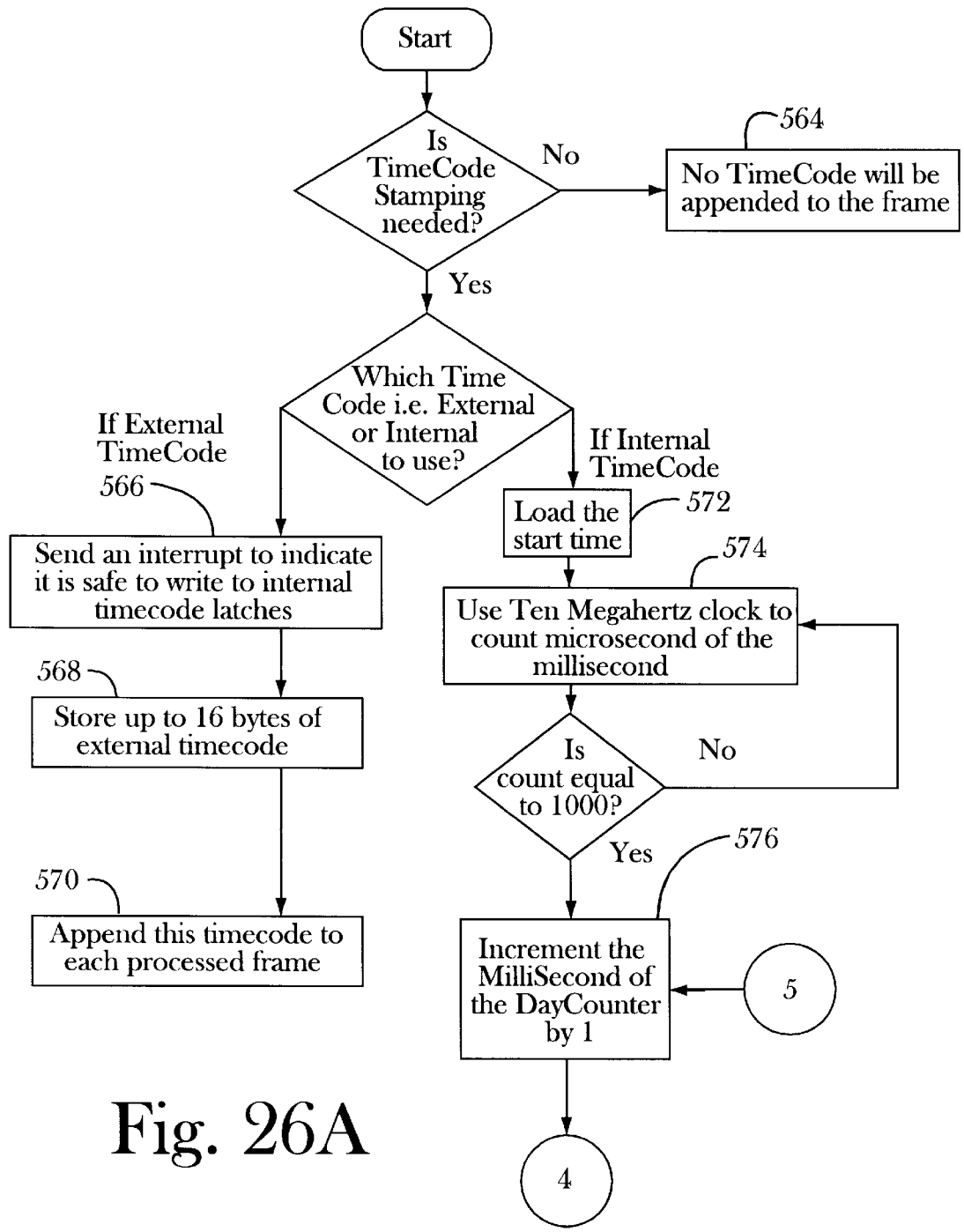
FIGS. 26A and 26B are flow charts illustrative of the operation of the time code interface subsystem.
Figure 26B:
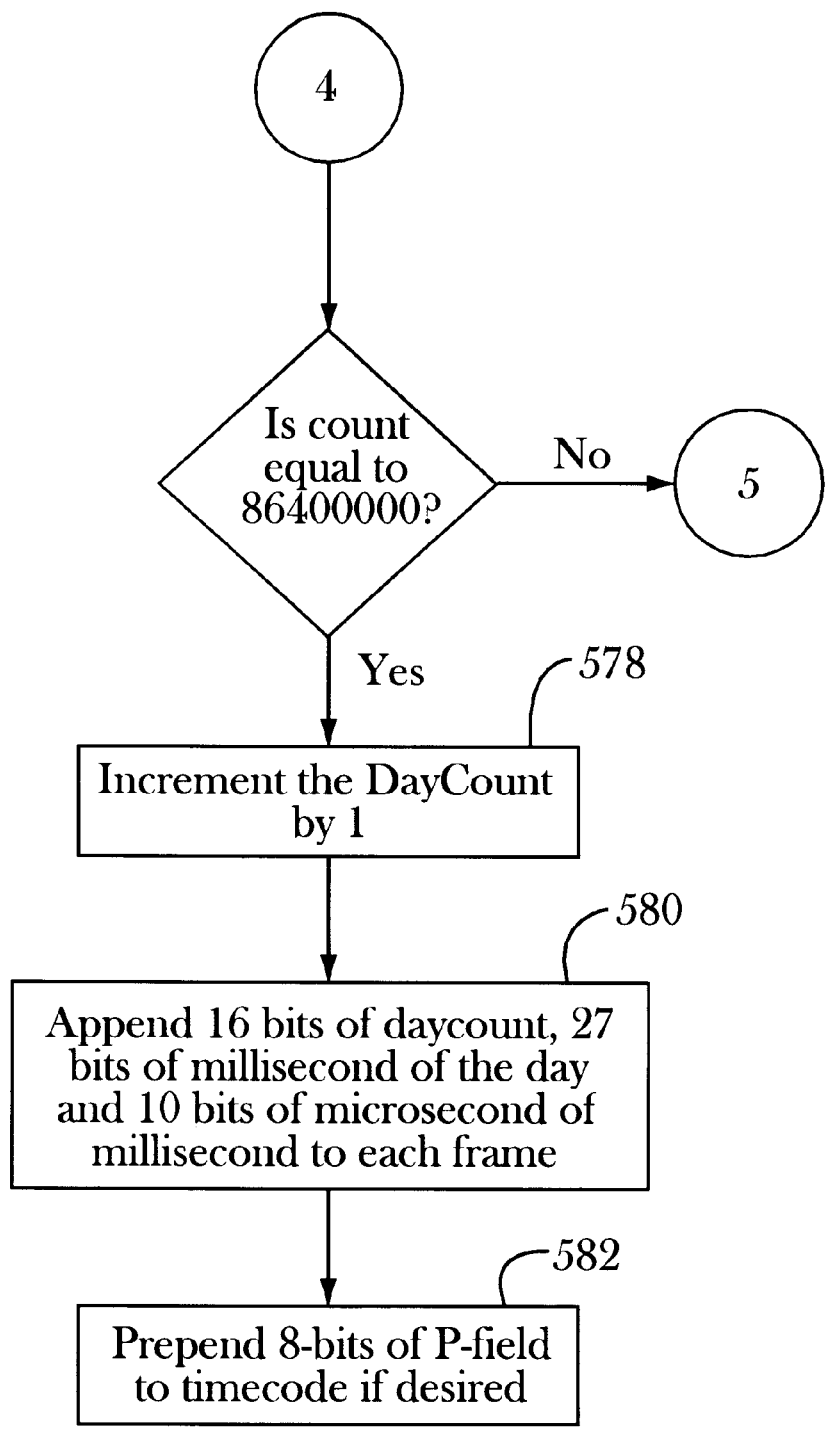

Before discussing the flow charts of the periodic output controller and cumulative quality counters shown in FIGS. 27 and 28, reference will first be made to the flow chart for the timecode interface 90 shown in FIG. 15 and which is depicted at FIGS. 26A and 26B. Referring now to FIG. 26A, if no timecode stamping is required, then no timecode will be appended to the frame data as indicated by step 564. If time coding is required and external timecode is to be used, an interrupt is sent per step 566 to indicate that it is safe to write to internal timecode latches, whereupon up to 16 bytes of external timecode are stored, as shown by reference numeral 568. This timecode is then appended to each processed data frame, as shown by reference numeral 570.

If an internal timecode is to be used, the start time is then loaded into the system as shown by step 572, a 10 MHz clock signal is then used to count microseconds of milliseconds in accordance with step 574. If the count is equal to a thousand, then the millisecond counter of the day is incremented by 1 per step 576. If the count is not equal to a thousand, then a return to step 574 occurs until such an equality exists.

Referring to FIG. 26B, if the millisecond of the day count is equal to the number 86,400,000, then the day counter is incremented by 1 as shown by step 578. If such a count does not occur, then the millisecond of day counter is incremented by 1 again until such count is equal to the count necessary to increment the day counter shown by step 576 (FIG. 26A). Following this, 16 bits of "daycount", 27 bits of millisecond of the day and 10 bits of microsecond of millisecond are appended to each data frame, as shown by reference numeral 580. Also, if desirable, 8 bits of P-field is prepended to the timecode as shown by step 582.

Figure 27:
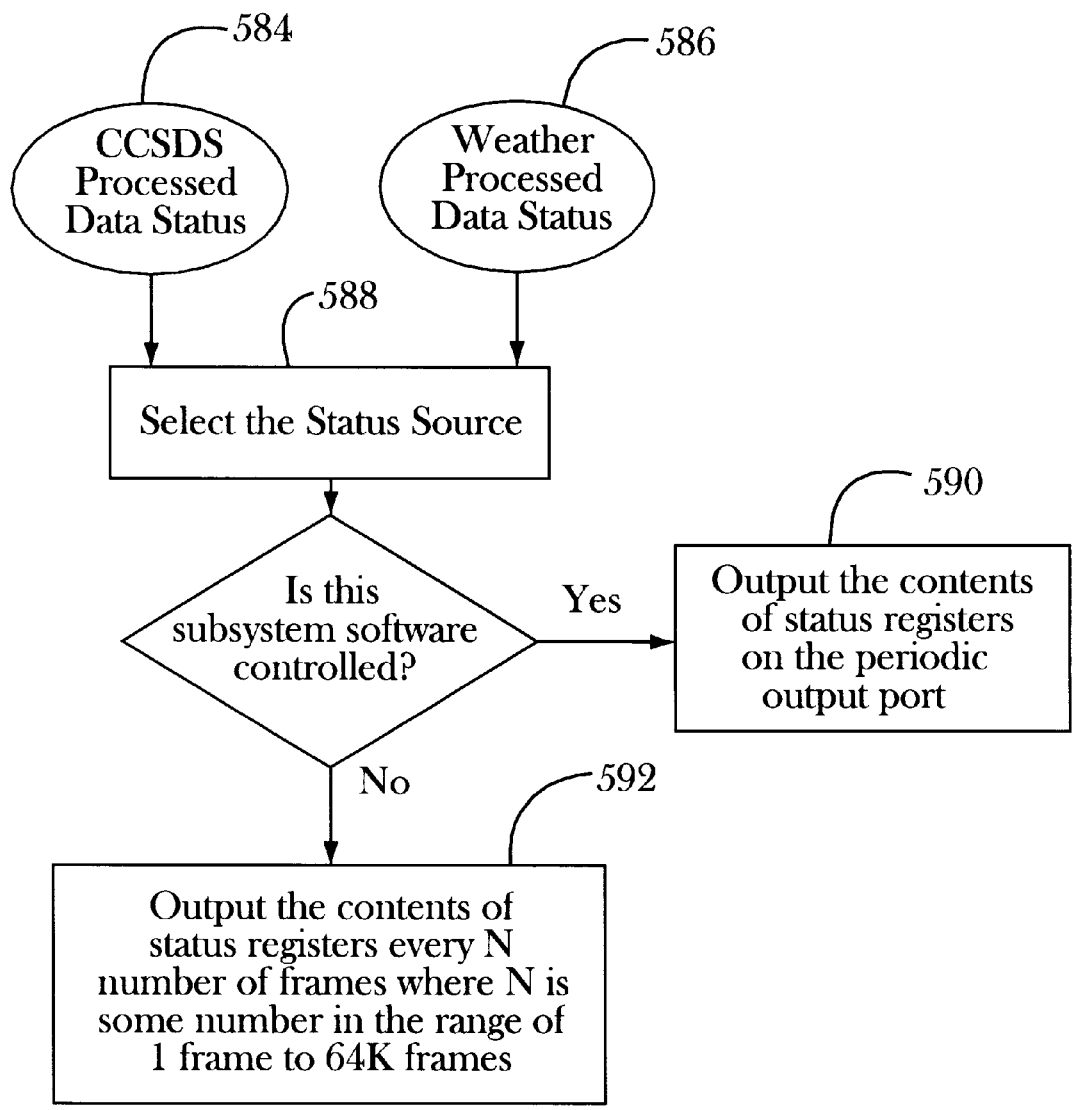
FIG. 27 is a flow chart illustrative of the operation of the periodic output subsystem shown in FIG. 16.

Referring now to FIG. 27, shown thereat is the flow chart for the periodic output controller subsystem 98 shown in FIG. 16. Inasmuch as the periodic output controller subsystem 98 monitors the status of either CCSDS processed data or weather processed data, in accordance with reference numerals 584 and 586, the source is selected per step 588 and if the periodic subsystem is software controlled, the contents of certain status registers 96 shown in FIG. 7, are output on the periodic output port coupled to the OUTDATABUS 344 shown in FIG. 16 in accordance with step 590. If the periodic output subsystem 98 is not software controlled, then the contents of the status registers are output on OUTDATABUS 344 every N number of frames, where N is a number in the range between 1 and 64 K frames. This is indicated by step 592.

Figure 28:
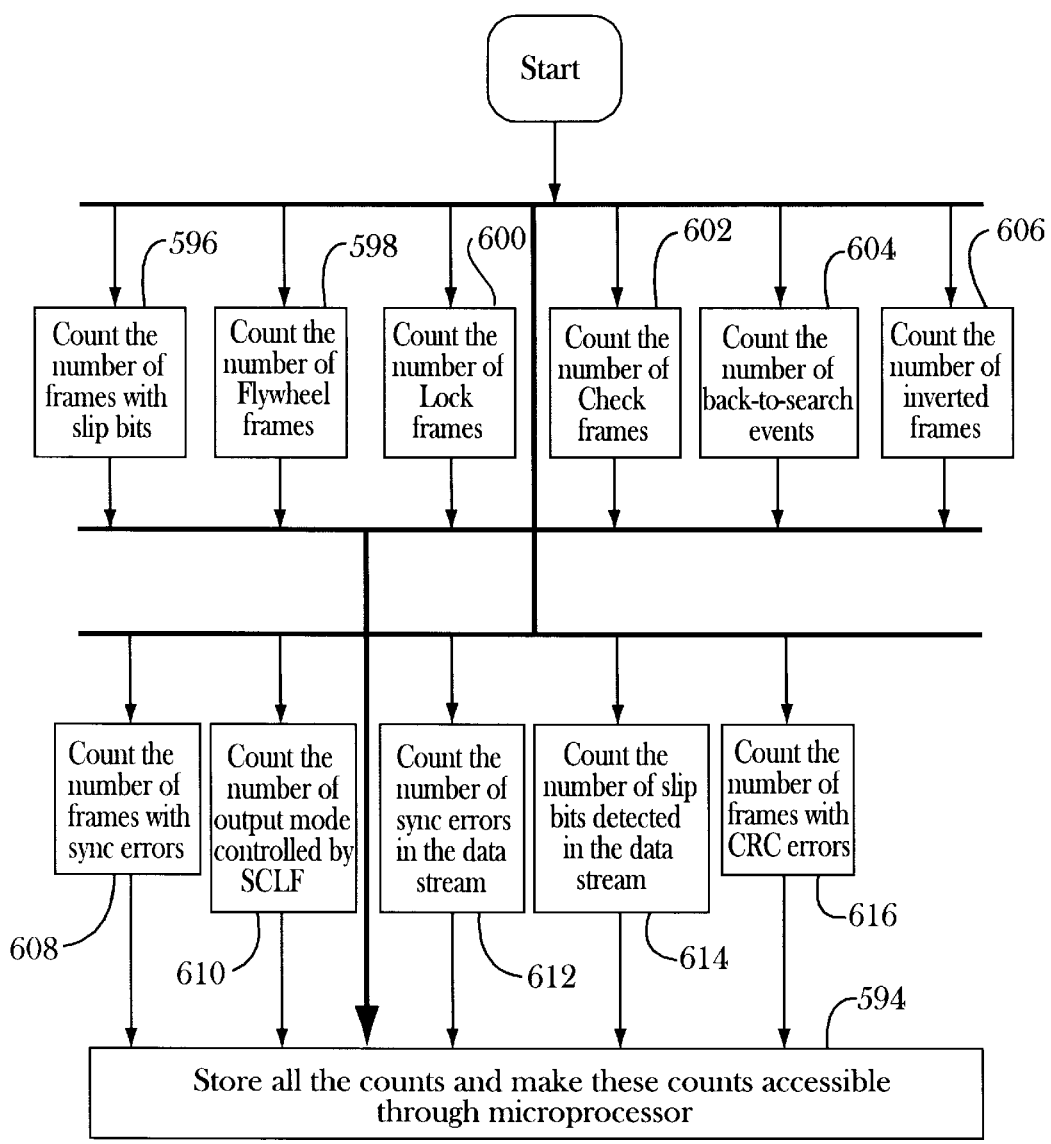
FIG. 28 is a flow chart illustrative of the operation of the cumulative quality counter subsystem shown in FIG. 17.

Next and finally, the flow chart for the cumulative quality counters 100 (FIG. 17) is depicted at FIG. 28. The flow chart of FIG. 28 simply shows that 12 different parameters are counted and stored and made accessible through operation of the microprocessor 44 shown in FIG. 5 in accordance with step 594 shown in FIG. 28. Reference numeral 596 indicates that the number of frames with slip bits are counted. Reference numeral 598 indicates that the number of flywheel frames are counted. Reference numeral 600 indicates that the number of lock frames are counted. In a like manner, the number of check frames are counted as shown by step 602. The number of back-to-search events are counted as shown by reference numeral 604. The number of inverted frames are also counted as shown by reference numeral 606. The number of frames with sync errors are counted as shown by step 608. The number of output modes controlled by SCLF strategy shown in FIG. 11 is also counted per step 610. Also, the number of sync errors in the data stream are counted per step 612. The number of slip bits detected in the data stream are additionally counted as shown by step 614. The number of frames with CRC errors are also counted in accordance with the step shown by reference numeral 616. This concludes a discussion of the various flow charts for the subsystems shown in FIG. 6.

Accordingly, what has been shown and described is a parallel frame synchronizer which is operable to: (a) provide rate detection with 24-bit rate counter and four levels of counter resolution; (b) performs correlation to any bit pattern up to 64 bits; (c) provides the capability to program bit error tolerance allowing up to 15-bit errors for correlation; (d) provides the capability to program frame size (up to 64 K bytes) and frame sync marker size; (e) provide the capability to program search, check, lock, and flywheel strategy (up to 15 check frames and up to 15 flywheel frames and an optional best-matched strategy); (f) perform slip correction (up to ±4 bits); (g) provide four modes of operation which include, fixed frame length, variable frame length, and asynchronous blocking of data; (h) provide optional cyclical redundancy check (CRC) decoding using Consultative Committee for Space Data Systems (CCSDS) recommended polynomial; (i) perform bit transition density (BTD) decoding using the CCSDS recommended polynomial; (j) provide programmable offset (0 to 8 bytes) for both BTD and CRC to indicating starting point; (k) provide the capability to perform time-stamping via an internally generated timecode (CCSDS day segmented) or an external 8-bit port; (l) output data and bytes or words; (m) allowing up to 8 bytes of frame status and 16 bytes of timecode to appended to frames; and (n) perform frame synchronization of weather satellite data received from various types of weather satellites.

Having thus shown and described what is at present considered to be the preferred embodiment of the invention and its method of operation, it should be noted that the same has been made by way of illustration and not limitation. Accordingly, all modifications, alterations and changes coming within the spirit and scope of the invention are herein meant to be included.

What is claimed is:

1. A parallel integrated data frame synchronizer for locating valid sync marker bit patterns between frames of data in a serial telemetry data stream and receiving clock signals from a system clock, comprising:

(a) a front end subsystem for receiving synchronous and asynchronous input data from a plurality of input interfaces including parallel and serial interfaces;

(b) a parallel correlation subsystem coupled to the front end subsystem and including a plurality of multi-bit data comparators for respectively determining, in parallel, an error for each successive bit position of a multi-bit data byte in the input data by comparing the byte against a data byte of an expected sync marker bit pattern, and a corresponding plurality of sync marker generators for respectively generating a valid sync mark pattern when the total number of bit errors resulting from comparing are within a predetermined error tolerance;

(c) a window subsystem coupled to the parallel correlation subsystem for locking onto one of said valid sync marker bit patterns;

(d) a data alignment subsystem coupled to the window subsystem for aligning bytes of data into data frames having predetermined byte boundaries following locking onto said one valid sync marker bit pattern;

(e) a BTD/CRC subsystem coupled to the data alignment subsystem for selectively performing optional bit transition density (BTD) decoding on the serial data stream when so encoded to assist in sync marker bit pattern locking or performing cyclic redundancy check (CRC) error detection on the serial data stream for detecting errors in the serial data stream; and (f) an output subsystem coupled to the BTD/CRC subsystem for outputting the serial data stream for external use in byte or word format.

2. A parallel integrated frame synchronizer according to claim 1 wherein said front end subsystem includes: (a) a first data input port for receiving data from a synchronous FIFO interface synchronized with the system clock; (b) a second data input port for receiving asynchronous input data from an asynchronous parallel data interface; (c) at least one third serial data input port and at least one corresponding serial clock port coupled to the system clock via a serial interface for inputting data in a serial stream; and (d) a CPU test data input port for inputting data from an external microprocessor for testing purposes.

3. A parallel integrated data frame synchronizer according to claim 1 wherein said front end subsystem includes means for synchronizing asynchronous input data to the system clock.

4. A parallel integrated data frame synchronizer according to claim 1 wherein said front end subsystem includes means for detecting the number of data bytes received during a selectable number of system clock cycles of the system clock.

5. A parallel integrated data frame synchronizer according to claim 1 wherein said front end subsystem includes timeout means for flushing data when input data is not received for a predetermined number of system clock cycles of the system clock.

6. A parallel integrated frame synchronizer according to claim 5 wherein said data alignment subsystem includes circuitry for padding the data frame to frame length bytes when flushing data is called for by said front end timeout means.

7. A parallel integrated frame synchronizer according to claim 1 wherein front end subsystem includes a non-return to zero (NRZ) decoder for converting input data encoded in a NRZ-M or NRZ-S format into a NRZ-L format.

8. A parallel integrated data frame synchronizer according to claim 1 wherein said parallel correlation subsystem additionally includes a sync marker selector for selecting a valid sync marker bit pattern generated by said plurality of sync marker generators and which has a bit position which coincides with the bit where the input data started.

9. A parallel integrated data frame synchronizer according to claim 1 wherein said parallel correlation subsystem additionally includes a plurality of adders equal in number to the number of said data comparators for determining the total number bit errors in the respective data bytes of the input data.

10. A parallel integrated frame synchronizer according to claim 1 wherein said sync marker generators in said parallel correlation subsystem also determine whether the input data is true or inverted data.

11. A parallel integrated frame synchronizer according to claim 1 wherein said window subsystem is operable to lock on said valid sync marker in four different modes including: (a) a regular mode wherein valid sync marker bit patterns are separated by predetermined constant data frame length bytes programmable by a user; (b) a variable frame length mode wherein said valid sync marker bit patterns are separated by at least two user programmable data frame lengths; (c) a free-range mode wherein said valid sync marker patterns lock to a data frame in accordance with a predetermined slip and error tolerance testing algorithm; and (d) an asynchronous block mode wherein the first byte of data is tagged as a first data frame and the data is thereafter blocked in into predetermined frame length blocks.

12. A parallel integrated frame synchronizer according to claim 11 wherein said algorithm comprises an algorithm which effects a best match strategy between a valid sync marker bit pattern and a designated data frame length.

13. A parallel integrated frame synchronizer according to claim 11 wherein said algorithm comprises a search/check/lock/flywheel algorithm.

14. A parallel integrated frame synchronizer according to claim 1 wherein said data alignment subsystem includes means inverting said data frames when parallel correlation subsystem determines the input data to be inverted data.

15. A parallel integrated frame synchronizer according to claim 1 wherein said data alignment subsystem includes means for filling the last byte of a data frame when slips occur which can add or subtract bits from the data frame.

16. A parallel integrated frame synchronizer according to claim 1 wherein a CCDSD code as represented by $(h(x)=x^8+x^7+x^5+x^3+1)$ is used in performing said BTD decoding in said BTD/CRC subsystem.

17. A parallel integrated frame synchronizer according to claim 1 wherein said BTD/CRC subsystem includes means for skipping a predetermined number of bytes of data before performing BTD decoding.

18. A parallel integrated frame synchronizer according to claim 1 wherein a CCSDS cyclic redundancy code as represented by $(g(x)=x^{16}+x^{12}+x^5+1)$ and its inverse $(g(x))^{-1}=x^{16}+x^{11}+x^4+1)$ are used in performing CRC error detection in said BTD/CRC subsystem.

19. A parallel integrated frame synchronizer according to claim 1 and further comprising:

(g) a timecode interface subsystem including means for appending an internally generated timecode or an externally generated timecode to a data frame output from the output subsystem.

20. A parallel integrated frame synchronizer according to claim 19 wherein said internally generated timecode is day segmented.

21. A parallel integrated frame synchronizer according to claim 19 wherein said externally generated timecode is user defined.

22. A parallel integrated frame synchronizer according to claim 1 and further comprising:
   (h) a control and status section including a periodic output controller subsystem, a cumulative quality counter subsystem, a plurality of set-up registers and a plurality of status registers.

23. A parallel integrated frame synchronizer according to claim 22 wherein said periodic output subsystem is coupled to the group of status registers for periodically outputting the contents of the status registers to an output port in one of two modes, said modes including a mode wherein status is output on a periodic basis independent of any data flow and a mode wherein status is output every N data frames, where $N \geq 1$.

24. A parallel integrated frame synchronizer according to claim 22 wherein said cumulative quality subsystem includes a control block and plurality of counters which count and output the number of counted lock frames, check frames, flywheel frames, frames with sync errors, frames with slip bits, frames with CRC errors, inverted frames, back-to-search events, sync errors and slip bits.

25. A parallel integrated frame synchronizer according to claim 1 and further comprising:
   (i) a weather satellite data processing subsystem for processing serial input weather data transmitted from a weather satellite system and feeding processed weather data to said output subsystem.

26. A parallel integrated frame synchronizer according to claim 25 and wherein said weather satellite data processing system includes a serial data correlator including a plurality of pseudo noise generators generating respective pseudo noise sequences for correlating the serial input weather data against said pseudo noise sequences and generating a correlated serial data stream and determining a start bit of the data stream, a pseudo-noise decoder for decoding the correlated data stream and generating a decoded serial data stream and a complement of the decoded serial data stream, and a header data extractor and a data alignment block coupled to said decoder, said header data extractor determining the word length and data frame length of the decoded serial data stream, said data alignment block forming the decoded serial data stream in a predetermined word size and being fed to said output subsystem as bytes regardless of word size.

27. A parallel integrated frame synchronizer according to claim 26 and wherein said weather satellite data processing system additionally includes a CRC error detector block for detecting errors in the decoded weather data stream and outputting a CRC error signal.

28. A parallel integrated frame synchronizer according to claim 26 wherein said plurality of pseudo noise (PN) generators include a pair of PN generators for respectively generating two different sequences A and B and a pair of PN generators for respectively generating the inverse (I) of sequences A and B.

29. A method of synchronizing a serial data stream with a system clock, comprising the steps of:
   (a) receiving synchronous and asynchronous digital input data from a plurality of input interfaces including parallel and serial interfaces; (b) correlating the input data by determining, in parallel, an error for each successive bit position of a multi-bit data byte in the input data by comparing the byte against a data byte of an expected sync marker bit pattern, and generating a plurality of valid sync mark patterns when the total number of bit errors resulting from comparing are within a predetermined error tolerance;
   (c) locking onto one of said valid sync marker bit patterns;
   (d) aligning bytes of data into data frames having predetermined byte boundaries following locking onto said one valid sync marker bit pattern;
   (e) selectively performing optional bit transition density (BTD) decoding on the serial data stream when so encoded to assist in sync marker bit pattern locking or performing cyclic redundancy check (CRC) error detection on the serial data stream for detecting errors in the serial data stream; and
   (f) outputting the serial data stream for external use in byte or word format.

30. A method in accordance with claim 29 wherein said plurality of interfaces include: (i) a synchronous FIFO interface; (ii) an asynchronous parallel data interface; (iii) a serial interface; and (iv) a test interface for inputting test data.

31. A method in accordance with claim 29 wherein the correlating step (b) includes determining the total number bit errors in the respective data bytes of the input data.

32. A method in accordance with claim 29 wherein the correlating step (b) includes selecting the valid sync marker bit pattern from said plurality of sync marker patterns which has a bit pattern which coincides with the bit where the input data started.

33. A method in accordance with claim 29 wherein said locking step (c) comprises locking on said one valid sync marker by way of four different locking modes including: (i) a regular mode wherein valid sync marker bit patterns are separated by predetermined constant data frame length bytes programmable by a user; (ii) a variable frame length mode wherein said valid sync marker bit patterns are separated by at least two user programmable data frame lengths; (iii) a free-range mode wherein said valid sync marker patterns lock to a data frame in accordance with a predetermined slip and error tolerance testing algorithm; and (iv) an asynchronous block mode wherein the first byte of data is tagged as a first data frame and the data is thereafter blocked in into predetermined frame length blocks.

34. A method in accordance with claim 33 wherein said algorithm comprises a search/check/lock/flywheel algorithm.

35. A method in accordance with claim 33 wherein said algorithm comprises an algorithm which effects a best match strategy between a valid sync marker bit pattern and a designated data frame length.

36. A method in accordance with claim 29 wherein said decoding step (e) includes optional bit transition density (BTD) decoding using a CCSDS code as represented by $(h(x)=x^8+x^7+x^5+x^3+1)$.

37. A method in accordance with claim 29 wherein said step (e) of performing cyclic redundancy check (CRC) error detection includes using a CCSDS cyclic redundancy code as represented by $(g(x)=x^{16}+x^{12}+x^5+1)$ and its inverse $(g(x))^{-1}=x^{16}+x^{11}+x^4+1)$.

38. A method in accordance with claim 29 and further comprising the step of:
   (g) appending an internally generated timecode or an externally generated timecode to an output data frame.

39. A method in accordance with claim 29 and further comprising the step of:

(h) processing a serial data stream consisting of weather data transmitted from a weather satellite system.

40. A method in accordance with claim 39 wherein said step (h) of processing weather data includes: generating a plurality of pseudo noise sequences, correlating the serial data stream consisting of weather data against said pseudo noise sequences, generating a correlated serial data stream, determining a start bit of the data stream, decoding the correlated data stream, generating a complement of the correlated decoded serial data stream, determining the word length and data frame length of the decoded serial data stream, formatting the decoded serial data stream in a predetermined word size, and feeding the serial data stream to an output port as bytes regardless of word size.

* * * * *